United States Patent
Overmyer et al.

(10) Patent No.: US 12,514,572 B2
(45) Date of Patent: Jan. 6, 2026

(54) SEPARABLE SURGICAL INSTRUMENT JOINTS

(71) Applicant: Cilag GmbH International, Zug (CH)

(72) Inventors: Mark D. Overmyer, Cincinnati, OH (US); Spencer Witte, San Francisco, CA (US); Dimitrios Chatzigeorgiou, Redwood City, CA (US); Grant Nair, Cincinnati, OH (US)

(73) Assignee: Cilag GmbH International, Zug (CH)

( * ) Notice: Subject to any disclaimer, the term of this patent is extended or adjusted under 35 U.S.C. 154(b) by 1142 days.

(21) Appl. No.: 17/481,984

(22) Filed: Sep. 22, 2021

(65) Prior Publication Data
US 2023/0087621 A1    Mar. 23, 2023

(51) Int. Cl.
*A61B 17/00* (2006.01)
*A61B 17/34* (2006.01)

(52) U.S. Cl.
CPC .... *A61B 17/00234* (2013.01); *A61B 17/3421* (2013.01); *A61B 2017/00309* (2013.01); *A61B 2017/00323* (2013.01)

(58) Field of Classification Search
CPC ............ A61B 18/1442; A61B 18/1445; A61B 2017/2095; A61B 2017/2908; A61B 2017/2927; A61B 2034/305; A61B 2034/306
See application file for complete search history.

(56) References Cited

U.S. PATENT DOCUMENTS

| | | | |
|---|---|---|---|
| 6,017,356 A | 1/2000 | Frederick et al. |
| 7,112,201 B2 | 9/2006 | Truckai et al. |
| 7,169,145 B2 | 1/2007 | Isaacson et al. |
| 8,114,345 B2 | 2/2012 | Dlugos, Jr. et al. |
| 8,147,457 B2 | 4/2012 | Michael et al. |
| 8,353,873 B2 | 1/2013 | Sakai, Jr. et al. |
| 8,444,557 B2 | 5/2013 | Schleitweiler et al. |
| 8,460,186 B2 | 6/2013 | Ortiz et al. |
| 8,500,633 B2 | 8/2013 | Ortiz et al. |
| 8,517,932 B2 | 8/2013 | Sakai, Jr. et al. |

(Continued)

FOREIGN PATENT DOCUMENTS

| | | |
|---|---|---|
| DE | 4324254 C1 | 1/1995 |
| WO | WO-2014151621 A1 | 9/2014 |
| WO | WO-2014151952 A1 | 9/2014 |

OTHER PUBLICATIONS

International Preliminary Report on Patentability for PCT Pat. App. No. PCT/IB2022/058866 mailed Mar. 26, 2024.(9 pages).

(Continued)

*Primary Examiner* — Ronald Hupczey, Jr.
(74) *Attorney, Agent, or Firm* — Vorys, Sater, Seymour and Pease LLP

(57) ABSTRACT

In general, separable surgical instrument joints and methods of using separable surgical instrument joints are provided. In an exemplary embodiment, a surgical instrument includes a joint at which a distal tip of the surgical instrument is configured to articulate relative to an elongate shaft of the instrument. The surgical instrument is configured to move between first and second states. In the first state, the distal tip of the surgical instrument cannot be articulated relative to the elongate shaft. In the second state, the distal tip can be articulated relative to the elongate shaft.

21 Claims, 8 Drawing Sheets

(56) References Cited

U.S. PATENT DOCUMENTS

| | | |
|---|---|---|
| 9,486,241 B2 | 11/2016 | Zeiner et al. |
| 10,010,366 B2 | 7/2018 | Strobl |
| 10,016,246 B2 | 7/2018 | Yates et al. |
| 10,149,726 B2 | 12/2018 | Hibner |
| 10,335,129 B2 | 7/2019 | Boudreaux |
| 10,758,269 B2 | 9/2020 | Morgan et al. |
| 10,758,270 B2 | 9/2020 | Harris et al. |
| 10,820,924 B2 | 11/2020 | Hall et al. |
| 10,856,942 B2 | 12/2020 | Murrell et al. |
| 10,932,808 B2 | 3/2021 | Shelton, IV et al. |
| 2012/0259325 A1 | 10/2012 | Houser et al. |
| 2016/0166347 A1* | 6/2016 | Kishi ............... A61B 34/37 606/130 |
| 2018/0206904 A1 | 7/2018 | Felder et al. |
| 2020/0315685 A1 | 10/2020 | Brady et al. |
| 2020/0315689 A1 | 10/2020 | Schneider et al. |

OTHER PUBLICATIONS

International Search Report and Written Opinion for PCT Pat. App. No. PCT/IB2022/058866 mailed Nov. 21, 2022.(14 pages).

* cited by examiner

SEPARABLE SURGICAL INSTRUMENT JOINTS

FIELD

The present disclosure generally relates to separable surgical instrument joints.

BACKGROUND

Minimally invasive surgical (MIS) instruments are often preferred over traditional open surgical devices due to the reduced post-operative recovery time and minimal scarring. Laparoscopic surgery is one type of MIS procedure in which one or more small incisions are formed in the abdomen and a trocar is inserted through the incision to form a pathway that provides access to the abdominal cavity. The trocar is used to introduce various instruments and tools into the abdominal cavity, as well as to provide insufflation to elevate the abdominal wall above the organs. The instruments and tools can be used to engage and/or treat tissue in a number of ways to achieve a diagnostic or therapeutic effect. Endoscopic surgery is another type of MIS procedure in which elongate flexible shafts are introduced into the body through a natural orifice.

Although traditional minimally invasive surgical instruments and techniques have proven highly effective, newer systems may provide even further advantages. For example, traditional minimally invasive surgical instruments often deny the surgeon the flexibility of tool placement found in open surgery. Difficulty is experienced in approaching the surgical site with the instruments through the small incisions. Such difficulty has been found to be an impediment in the increased the use of minimally invasive surgery.

Accordingly, there remains a need for improved surgical instruments.

SUMMARY

In general, separable surgical instrument joints and methods of using separable surgical instrument joints are provided.

In one aspect, a surgical system is provided that in one embodiment includes a joint of a surgical instrument. The joint includes a distal joint element and a proximal joint element, and the joint is configured to be inserted into a body of a patient. The surgical system also includes a plurality of articulation cables of the surgical instrument extending between and within the distal and proximal joint elements. The joint is movable between a first state, in which the proximal and distal joint elements are a first distance apart from one another and in which the articulation cable cannot be actuated to articulate the distal joint element relative to the proximal joint element, and a second state, in which the proximal and distal joint elements are a second distance apart from one another and in which the articulation cable can be articulated the distal joint element relative to the proximal joint element. The second distance is less than the first distance.

The surgical system can vary in any number of ways. For example, in the first state the articulation cables can be slack, and in the second state the articulation cables can be tight.

For another example, the surgical system can also include a second cable of the surgical instrument, the second cable can extend between and within the distal and proximal joint elements, in the first state the energy cable can be contained within an outer diameter of the joint, and in the second state the energy cable can not be contained within the outer diameter of the joint. In some embodiments, the movement of the joint from the first state to the second state can be configured to cause the energy cable to buckle outside of the outer diameter of the joint. The movement of the joint from the second state to the first state can be configured to enable the energy cable to return to being contained within the outer diameter of the joint. In some embodiments, the surgical system can also include a cannula having an inner lumen in which the joint is configured to be advanced into the body of the patient, the inner lumen can define an inner diameter of the cannula, and the outer diameter of the joint can be less than the inner diameter of the cannula. In some embodiments, the second cable can be an energy cable configured to deliver energy to tissue in the body of the patient. In some embodiments, the second cable can be a data communication cable. In some embodiments, the second cable can be a firing cable configured to cause movement of a cutting element to cut tissue. In some embodiments, the second cable can be a sensing cable in operable communication with a sensor of the surgical instrument.

For yet another example, the distal joint element can include a first boss at a proximal end thereof, the proximal joint element can include a second boss at a distal end thereof, in the first state the first and second bosses can be disengaged so as to prevent the distal joint element from being articulated relative to the proximal joint element, and in the second state the first and second bosses can be engaged at a pivot point defined between the first and second bosses so as to allow the distal joint element to be pivoted at the pivot point relative to the proximal joint element to articulate the distal joint element relative to the proximal joint element.

For another example, the surgical system can also include a knuckle of the surgical instrument, the knuckle can be disposed between the first joint element and the second joint element, the joint can define a first longitudinal axis, the knuckle can define a second longitudinal axis, in the first state the second longitudinal axis can be offset from the first longitudinal axis, and in the second state the second longitudinal axis can be aligned with the first longitudinal axis. In some embodiments, a first cut-out can be formed in a proximal end of the distal joint element, a second cut-out can be formed in a distal end of the proximal joint element, in the first state the knuckle can not be seated in the first cut-out or the second cut-out, and in the second state the knuckle can be seated in the first cut-out and in the second cut-out. In the first state the articulation cables can be slack and not extend along a surface of the knuckle, in the second state the articulation cables can be tight and can extend along the surface of the knuckle, and the actuation of the articulation cables can be configured to cause the knuckle to pivot at at least one of the first cut-out, relative to the distal joint element, and the second cut-out, relative to the proximal joint element. In some embodiments, in the first state the articulation cables can be slack and not seated in a groove formed in the knuckle, in the second state the articulation cables can be tight and seated in the groove, and the knuckle can include a shield configured to, in the first state, hold the articulation cables near the groove. In some embodiments, the distal and proximal joint elements can be configured to maintain a rotational alignment of the knuckle relative to the distal and proximal joint elements. In some embodiments, the surgical system can also include an energy cable of the surgical instrument, the energy cable can extend between and within the distal and proximal joint elements, the energy cable can be configured to deliver energy to tissue in the body of the patient, the surgical system can also include a rack and pinion of the surgical instrument, and the rack and pinion can be configured to, in the first state, urge the energy cable distally.

For yet another example, the proximal joint element can include an elongate shaft of the surgical instrument.

In another embodiment, a surgical system is provided that includes an elongate shaft having an outer diameter and configured to be advanced into a body of a patient, an instrument tip distal to the elongate shaft and configured to lead the advancement of the elongate shaft into the body of the patient, and an energy cable extending between and within the elongate shaft and the tip. The energy cable is configured to deliver energy to tissue in the body of the patient. The elongate shaft and the tip are configured to move between a first configuration, in which the energy cable is contained within the outer diameter of the elongate shaft, a second configuration, in which the energy cable is not contained within the outer diameter of the shaft and in which the elongate shaft and the tip are closer to one another than in the first configuration.

The surgical system can have any number of variations. For example, the movement of the elongate shaft and the tip from the first configuration to the second configuration can be configured to cause the energy cable to buckle outside of the outer diameter of the elongate shaft. In some embodiments, the movement of the elongate shaft and the tip from the second configuration to the first configuration can be configured to cause the energy cable to return to being contained within the outer diameter of the elongate shaft.

For another example, the surgical system can also include a cannula having an inner lumen in which the elongate shaft and the tip are configured to be advanced into the body of the patient, the inner lumen can define an inner diameter of the cannula, the outer diameter of the elongate shaft can be less than the inner diameter of the cannula, and in the second configuration the energy cable can be bent radially outward so as to be wider than the inner diameter. For yet another example, the surgical system can also include an articulation cable extending between and within the elongate shaft and the tip, in the first configuration the articulation cable can be slack to prevent the articulation cable from being actuated to articulate the tip relative to the elongate shaft, and in the second configuration the articulation cable can be tight to allow the articulation cable to be actuated to articulate the tip relative to the elongate shaft.

For still another example, in the first configuration the tip cannot be articulated relative to the elongate shaft, and in the second configuration the tip can be articulated relative to the elongate shaft. In some embodiments, the tip can include a first boss at a proximal end thereof, the elongate shaft can include a second boss at a distal end thereof, in the first configuration the first and second bosses can be disengaged so as to prevent the tip from being articulated relative to the elongate shaft, and in the second configuration the first and second bosses can be engaged at a pivot point defined between the first and second bosses so as to allow the tip to be pivoted at the pivot point relative to the elongate shaft to articulate the tip relative to the elongate shaft.

For another example, the surgical system can also include a knuckle disposed between the elongate shaft and the tip, the elongate shaft can define a first longitudinal axis, in the first configuration a second longitudinal axis defined the knuckle can be offset from the first longitudinal axis, and in the second configuration the second longitudinal axis can be aligned with the first longitudinal axis. In some embodiments, a first cut-out can be formed in a proximal end of the tip, a second cut-out can be formed in a distal end of the elongate shaft, in the first configuration the knuckle can not be seated in the first cut-out or the second cut-out, and in the second configuration the knuckle can be seated in the first cut-out and in the second cut-out. In some embodiments, the surgical system can also include an articulation cable extending between and within the elongate shaft and the tip, in the first configuration the articulation cable can be slack and can not be seated in a groove formed in the knuckle, and in the second configuration the articulation cable can be tight and seated in the groove. In some embodiments, the elongate shaft and the tip can be configured to maintain a rotational alignment of the knuckle relative to the elongate shaft and the tip.

For yet another example, the surgical system can also include a rack and pinion configured to, in the first configuration, urge the energy cable distally. For still another example, the surgical system can also include a cannula having an inner lumen in which the elongate shaft and the tip are configured to be advanced into the body of the patient, the surgical system can also include a controller, and the controller can be configured to home the surgical instrument with the elongate shaft positioned in the inner lumen of the cannula and the tip positioned distal to the cannula and in the second configuration.

In another aspect, a surgical method is provided that in one embodiment includes, with a surgical instrument being in a first configuration, advancing an elongate shaft of the surgical instrument into a body of a patient with a tip of the surgical instrument that is distal to the elongate shaft leading the advancement of the surgical instrument into the body of the patient. In the first configuration an energy cable of the surgical instrument is contained within an outer diameter of the elongate shaft. The surgical method also includes, with the tip in the body of the patient, moving the surgical instrument from the first configuration to a second configuration, in which the energy cable is contained within the outer diameter of the elongate shaft and in which the elongate shaft and the tip are closer to one another than in the first configuration. The surgical method also includes, with the surgical instrument in the second configuration, causing the energy cable to deliver energy to tissue of the patient.

The surgical method can vary in any number of ways. For example, with the surgical instrument in the first configuration, the energy cable cannot deliver energy to tissue of the patient.

For another example, moving the surgical instrument from the first configuration to the second configuration can cause the energy cable to buckle outside of the outer diameter of the elongate shaft. In some embodiments, the surgical method can also include moving the surgical instrument from the second configuration to the first configuration, thereby causing the energy cable to return to being contained within the outer diameter of the elongate shaft.

For yet another example, the advancing can include advancing the elongate shaft through an inner lumen of a cannula, the inner lumen can define an inner diameter of the cannula, the outer diameter of the elongate shaft can be less than the inner diameter of the cannula, and in the second configuration the energy cable can be bent radially outward so as to be wider than the inner diameter. In some embodiments, the surgical method can also include homing the surgical instrument in the second configuration with the elongate shaft positioned in the inner lumen of the cannula and the tip positioned distal to the cannula.

For another example, with the surgical instrument in the first configuration, the tip cannot be articulated relative to the elongate shaft, and, with the surgical instrument in the second configuration, the tip can be articulated relative to the elongate shaft. In some embodiments, an articulation cable can extend between and within the elongate shaft and the tip, in the first configuration the articulation cable can be slack and not seated in a groove formed in the knuckle, and in the second configuration the articulation cable can be tight and seated in the groove.

For still another example, the tip can include a first boss at a proximal end thereof, the elongate shaft can include a second boss at a distal end thereof, in the first configuration the first and second bosses can be disengaged so as to prevent the tip from being articulated relative to the elongate shaft, in the second configuration the first and second bosses can be engaged at a pivot point defined between the first and second bosses so as to allow the tip to be pivoted at the pivot point relative to the elongate shaft to articulate the tip relative to the elongate shaft, and the surgical method can also include, with the surgical instrument in the second configuration, causing the tip to pivot at the pivot point relative to the elongate shaft to articulate the tip relative to the elongate shaft.

For yet another example, a knuckle can be disposed between the elongate shaft and the tip, the elongate shaft can defines a first longitudinal axis, in the first configuration a second longitudinal axis defined the knuckle can be offset from the first longitudinal axis, and in the second configuration the second longitudinal axis can be aligned with the first longitudinal axis. In some embodiments, a first cut-out can be formed in a proximal end of the tip, a second cut-out can be formed in a distal end of the elongate shaft, in the first configuration the knuckle can not be seated in the first cut-out or the second cut-out, and in the second configuration the knuckle can be seated in the first cut-out and in the second cut-out. In some embodiments, the elongate shaft and the tip can maintain a rotational alignment of the knuckle relative to the elongate shaft and the tip.

For another example, the surgical instrument can include a rack and pinion that, in the first configuration, urges the energy cable distally.

BRIEF DESCRIPTION OF DRAWINGS

This disclosure will be more fully understood from the following detailed description taken in conjunction with the accompanying drawings, in which.

DETAILED DESCRIPTION

Figure 1:
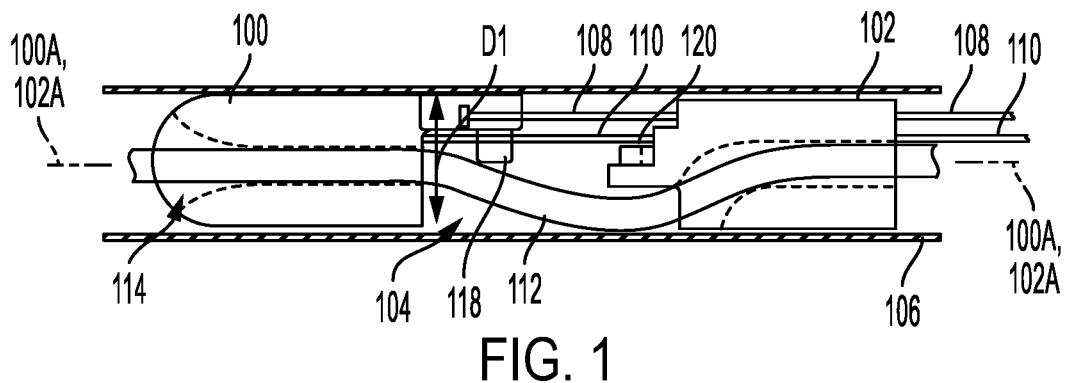
FIG. 1 is a top view of a distal portion of one embodiment of a surgical instrument in a first state and positioned in one embodiment of a cannula.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices, systems, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

In general, separable surgical instrument joints and methods of using separable surgical instrument joints are provided. In an exemplary embodiment, a surgical instrument includes a joint at which a distal tip of the surgical instrument is configured to articulate relative to an elongate shaft of the instrument. The surgical instrument is configured to move between first and second states (also referred to herein as "configurations"). In the first state, the distal tip of the surgical instrument cannot be articulated relative to the elongate shaft. Thus, when the surgical instrument is in the first state, an articulation mechanism of the surgical instrument can be disabled from being actuated to effect articulation of the distal tip. In the second state, the distal tip can be articulated relative to the elongate shaft. Thus, when the surgical instrument is in the second state, an articulation mechanism of the surgical instrument can be able to be actuated to effect articulation of the distal tip.

At certain times during performance of a surgical procedure, articulation of the distal tip will typically not be needed. For example, articulation of the distal tip is typically not needed during introduction of a surgical instrument into a patient's body or during removal of the surgical instrument from the patient's body but instead be needed when the surgical instrument's distal tip is located in the patient's body where the distal tip may need to be articulated to, e.g., securely access, contact, and/or move tissue and/or other target matter, maneuver around tissue and/or another surgical instrument, etc. The surgical instrument can thus have the first state in which articulation is not possible without adversely affecting use of the surgical instrument or adversely affecting a surgical procedure in which the surgical instrument is used. The surgical instrument has a smaller maximum diameter, at least at the joint, in the first state than in the second state. The instrument can thus be advanced into and removed from the patient's body through a cannula having as small an inner diameter as possible, as the cannula must have an inner diameter that is large enough to allow the instrument to extend therethrough. Minimizing a size of a cannula may allow for minimally invasive surgery and/or may minimize a size of an incision through which the surgical instrument is inserted into and removed from a patient's body. The surgical instrument can be introduced into and/or removed from a patient's body in the second state, but typically such introduction and removal will be performed with the instrument in the first state to help facilitate and maximize benefits of minimally invasive surgery.

In an exemplary embodiment, the articulation mechanism of the surgical instrument includes one or more articulation cables that each extend between the elongate shaft and the distal tip through the joint. The one or more articulation cables can thus each be flexible to allow the at least one articulation cable to bend at the joint. The one or more articulation cables can each be configured to be pushed or pulled to, alone or in cooperation with pushing and/or pulling of one or more of the other articulation cable(s), cause articulation of the distal tip. To be effectively pushed or pulled to cause articulation, each of the one or more articulation cables is in a tight state. Thus, with the surgical instrument in the second state, each of the one or more articulation cables is in the tight state. With the surgical instrument in the first state, each of the one or more articulation cables is in a slack state instead of being in the tight state, thereby degrading ability to articulate the distal tip, if not preventing articulation of the distal tip entirety, since the articulation cable(s) cannot be actuated to cause articulation. With the surgical instrument in the second state, each of the one or more articulation cables is in the tight state, thereby allowing articulation of the distal tip.

In an exemplary embodiment, the surgical instrument includes an energy cable that is configured to deliver energy to tissue in a body of a patient, e.g., by delivering energy to an electrode or other energy-delivering mechanism at the distal tip of the surgical instrument. The energy cable extends between the elongate shaft and the distal tip through the joint and can thus be flexible to allow the energy cable to bend at the joint. A surgical instrument's energy cable can take up substantial volume within a joint of the instrument, thereby leaving little room for material to make the joint strong for stable, controlled articulation. The surgical instrument having first and second states allows the instrument to have the energy cable extend through the joint while providing a strong joint for stable, controlled articulation. With the surgical instrument in the first state, the energy cable is contained within an outer diameter defined by the joint. The joint can thus be advanced into and removed from the patient's body through a cannula having as small an inner diameter as possible, as the cannula must have an inner diameter that is large enough to allow the joint to extend therethrough. Minimizing a size of a cannula may allow for minimally invasive surgery and/or may minimize a size of an incision through which the surgical instrument is inserted into and removed from a patient's body. The energy cable being flexible allows the energy cable to bend around various element(s) at the joint in the first state while remaining within the outer diameter defined by the joint. With the surgical instrument in the second state, the energy cable can not be contained within the outer diameter defined by the joint so as to extend outside of the joint. The energy cable being flexible allows the energy cable to bend outside of the joint beyond the joint's outer diameter. A gap between the distal tip and the elongate shaft allows the energy cable to move outside of the joint and, when the joint is inside a patient's body, space available within a patient's body, allows the energy cable to be outside of the joint. The energy cable being outside the diameter defined by the joint increases an effective diameter of the instrument at the joint to be greater than the cannula's diameter and/or incision's diameter while still allowing the instrument to be inserted into the patient's body through the cannula and/or the incision, e.g., when the instrument is in the first state. The energy cable being outside the diameter defined by the joint may improve the strength of the joint for articulation by allowing for material to be at the joint in the second state to strengthen the joint.

The elongate shaft and the distal tip are configured to be in a different position relative to one another in the first and second states. Movement of surgical instrument between the first and second states automatically causes the relative position of the elongate shaft and the distal tip to change. The relative position of the elongate shaft and the distal tip in the first state allows for the energy cable to be contained within the joint's outer diameter and allows for the one or more articulation cables to be slack. In the first state, the distal tip and the elongate shaft are a first distance away from one another. The relative position of the elongate shaft and the distal tip in the second state allows for the energy cable to not be contained within the joint's outer diameter and allows for the one or more articulation cables to be tight. In the second state, the distal tip and the elongate shaft are a second distance away from one another that is less than the first distance. The second distance being less than the first distance allows for more material to be at the joint for articulation, e.g., by more of the distal tip and elongate shaft material to be at the joint, and thereby improve strength of the joint. The second distance being less than the first distance allows the one or more articulation cables to be tight and for the energy cable to be tight.

The surgical instruments disclosed herein can be configured to be at least partially positioned inside a patient's body through an access point in a tissue surface for minimally invasive surgical procedures. Typically, cannulas such as trocars and other access devices are used to provide a pathway through a tissue surface and to prevent an instrument inserted therethrough from rubbing on patient tissue. Cannulas can be used for both incisions and natural orifices. Some surgical procedures require insufflation, and the cannula can include one or more seals to prevent insufflation gas from leaking past the device. In some embodiments, the cannula can have a housing coupled thereto with one or more sealed ports for receiving various types of devices, such as the surgical instruments disclosed herein. In some embodiments, the instrument inserted through the cannula can have a functional seal disposed thereon, therein, and/or therearound to prevent and/or reduce insufflation leakage while any portion of the instrument is disposed through the cannula. The surgical instruments disclosed herein can also be configured to be used in open surgical procedures. As used herein, a surgical access point is a point at which the surgical instrument enters a body cavity through a tissue surface, whether through a cannula in a minimally invasive procedure or through an incision in an open procedure.

A variety of cannulas can be used with the surgical instruments described herein, such as various embodiments of cannulas described in more detail in U.S. Pat. No. 6,017,356 issued Jan. 25, 2000 entitled "Method For Using A Trocar For Penetration And Skin Incision," U.S. Pat. No. 8,147,457 entitled "Conical Trocar Seal" issued Apr. 3, 2012, U.S. Pat. No. 8,353,873 entitled "Methods And Devices For Providing Access Through Tissue To A Surgical Site" issued Jan. 15, 2013, U.S. Pat. No. 8,444,557 entitled "Methods And Devices For Providing Access Through Tissue To A Surgical Site" issued May 21, 2013, U.S. Pat. No. 8,460,186 entitled "Methods And Devices For Providing Access Through Tissue To A Surgical Site" issued Jun. 11, 2013, U.S. Pat. No. 8,500,633 entitled "Methods And Devices For Providing Access Through Tissue To A Surgical Site" issued Aug. 6, 2013, U.S. Pat. No. 8,517,932 entitled "Methods And Devices For Providing Access Through Tissue To A Surgical Site" issued Aug. 27, 2013, U.S. Pat. No. 9,486,241 entitled "Trocar Seal Assembly" issued Nov. 8, 2016, U.S. Pat. No. 10,758,269 entitled "Compliant Deflection Devices For Trocar Assemblies" issued Sep. 1, 2020, and U.S. Pat. No. 10,758,270 entitled "Surgical Tool Stabilization Devices For Trocar Assemblies" issued Sep. 1, 2020, and U.S. Pat. No. 10,820,924 entitled "Asymmetric Shaft Seal" issued Nov. 30, 2020, which are hereby incorporated by reference in their entireties.

Various embodiments of delivering energy, such as radiofrequency (RF) energy and/or ultrasound energy, to tissue using a surgical instrument are described in more detail in U.S. Pat. No. 7,112,201 entitled "Electrosurgical Instrument And Method Of Use" filed Jan. 22, 2003, U.S. Pat. No. 7,169,145 entitled "Tuned Return Electrode With Matching Inductor" filed Nov. 21, 2003, U.S. Pat. No. 10,010,366 entitled "Surgical Devices And Methods For Tissue Cutting And Sealing" filed Dec. 17, 2014, U.S. Pat. No. 10,335,129 entitled "Methods And Devices For Auto Return Of Articulated End Effectors" filed Nov. 17, 2015, U.S. Pat. Pub. No. 2020/00315685 entitled "Surgical Devices Switchable Between Monopolar Functionality And Bipolar Functionality" filed on Apr. 4, 2019, and U.S. Pat. Pub. No. 2020/00315689 entitled "Electrosurgical Devices With Monopolar And Bipolar Functionality" filed on Apr. 4, 2019, which are hereby incorporated by reference in their entireties.

A person skilled in the art will appreciate that the surgical instruments described herein have application in conventional minimally-invasive and open surgical instrumentation as well as application in robotic-assisted surgery.

Figure 2:
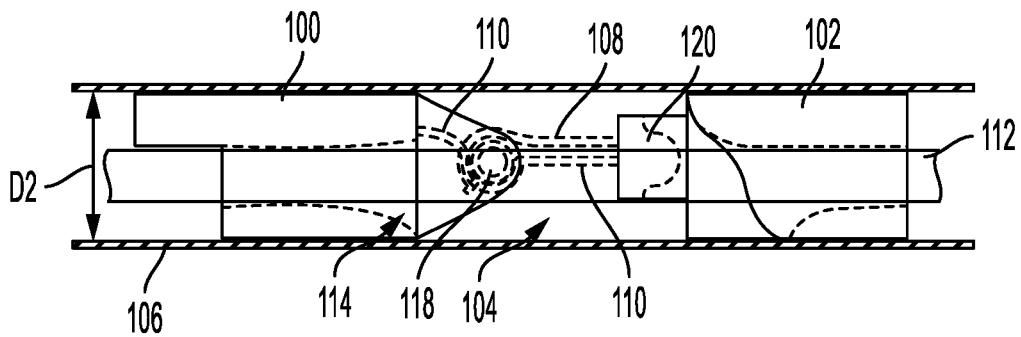
FIG. 2 is a front view of the distal portion of the surgical instrument of FIG. 1.
Figure 3:
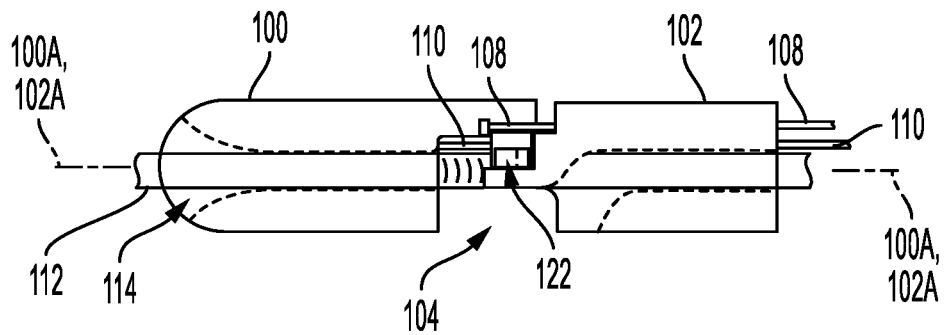
FIG. 3 is a top view of a distal portion of the surgical instrument of FIG. 1 in a second state and positioned outside the cannula.
Figure 4:
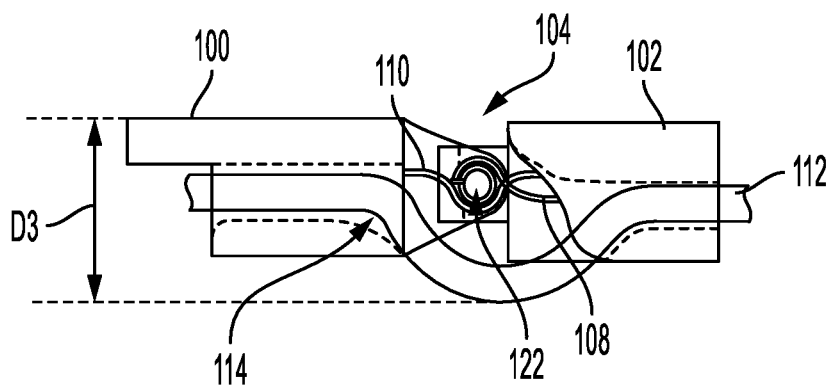
FIG. 4 is a front view of the distal portion of the surgical instrument of FIG. 3.

FIGS. 1-4 illustrate one embodiment of a surgical instrument including a distal joint element 100, a proximal joint element 102, and a joint 104 between the distal and proximal joint elements 102, 104. Joint elements are also referred to herein as "links." The distal joint element 100 is configured to articulate relative to the proximal joint element 102 at the joint 104. The joint 104 is configured as an axially separable joint, as discussed further below. The surgical instrument is configured to move between a first state, in which the distal joint element 100 cannot be articulated relative to the proximal joint element 102, and a second state, in which the distal joint element 100 can be articulated relative to the proximal joint element 102. FIGS. 1 and 2 show the instrument in the first state. FIGS. 1 and 2 also illustrate one embodiment of a cannula 106 through which the instrument is configured to be inserted into a body of a patient. FIGS. 3 and 4 show the instrument in the second state. In FIGS. 3 and 4 a distal portion of the instrument including the distal joint element 100 and the proximal joint element 102 has been advanced distally beyond the cannula 106. The cannula 106 is not shown in FIGS. 3 and 4 since the cannula 106 is located proximal to the distal and proximal joint elements 100, 102, e.g., located to the right in the view of FIGS. 3 and 4.

The distal joint element 100 is not articulated relative to the proximal joint element 102 in any of FIGS. 1-4. A longitudinal axis 100A of the distal joint element 100 is aligned with a longitudinal axis 102A of the proximal joint element 102 when the distal joint element 100 is not articulated relative to the proximal joint element 102, as shown in FIGS. 1-4. When the distal joint element 100 is articulated relative to the proximal joint element 102, the longitudinal axis 100A of the distal joint element 100 is angled at a non-zero angle relative to the longitudinal axis 102A of the proximal joint element 102.

The instrument includes an articulation mechanism configured to be actuated to articulate the distal joint element 100 relative to the proximal joint element 102. The articulation mechanism in this illustrated embodiment includes a first articulation cable 108 and a second articulation cable 110 (which includes a pair of cables). Each of the articulation cables 108, 110 extends between the proximal joint element 102 and the distal joint element 100 through the joint 104. A distal end of each of the articulation cables 108, 110 is attached to the distal joint element 100, e.g., by being crimped, welded, glued, tied, etc. to the distal joint element 100. The articulation cables 108, 110 are each flexible, which allow the articulation cables 108, 110 to bend at the joint 104 when the distal joint element 100 is articulated. The instrument includes three articulation cables 108, 110 in this illustrated embodiment for yaw movement and for pitch movement, but a surgical instrument can include another number of articulation cables.

Each of the articulation cables 108, 110 is operatively coupled to an articulation actuator of the instrument, such as by a proximal end of each of the articulation cables 108, 110 being attached to the actuator, e.g., by being crimped, welded, glued, tied, etc. to the articulation actuator or to another element such an elongate rod operatively coupled to the articulation actuator and attached at a distal end thereof to the proximal end of its respective articulation cable. The articulation actuator is configured to be actuated to cause articulation of the distal joint element 100 by pulling one of the articulation cables 108, 110, as discussed further below. Which one of the articulation cables 108, 110 is pulled and how much it is pulled affects how much and in which direction the distal joint element 100 articulates. The articulation actuator can have a variety of configurations and can be manually controlled or robotically controlled, as will be appreciated by a person skilled in the art.

The instrument includes an energy cable 112 configured to deliver energy to tissue in a body of a patient. The energy cable 112 extends between the proximal joint element 102 and the distal joint element 100 through the joint 104. The energy cable 112 is flexible, which allows the energy cable 112 to bend at the joint 104 when the distal joint element 100 is articulated. The energy cable 112 is a coaxial cable in this illustrated embodiment but can have other configurations. The energy cable 112 is a single cable in this illustrated embodiment but can include a plurality of cables.

The distal joint element 100 defines a distal tip of the instrument. The distal joint element 100 can have a variety of sizes, shapes, and configurations. The distal joint element 100 is cannulated in this illustrated embodiment, which allows the energy cable 112 to extend through an inner lumen 114 of the distal joint element 100 as shown in FIGS. 1-4. The distal joint element 100 has a blunt distal end in this illustrated embodiment, which may help prevent the distal joint element 100 from damaging tissue and/or other matter that contacts the blunt distal end.

The proximal joint element 102 can have a variety of sizes, shapes, and configurations. The proximal joint element 102 is cannulated in this illustrated embodiment, which allows the energy cable 112 and the first and second articulation cables 108, 110 to extend through an inner lumen 116 of the proximal joint element 102 as shown in FIGS. 1-4. The proximal joint element 102 can include a single inner lumen for the cables 108, 110, 112, as in this illustrated embodiment, or can include two or more inner lumens each configured to receive therein at least one of the cables 108, 110, 112.

The proximal joint element 102 can be a distal portion of an elongate shaft of the instrument that extends distally from a proximal housing of the instrument. Alternatively, as in this illustrated embodiment, the proximal joint element 102 can be a separate element from the elongate shaft and be coupled to a distal end of the elongate shaft. Whether the proximal joint element 102 is a part of or is separate from the elongate shaft, the elongate shaft extends proximally (to the right in the view of FIGS. 1-4) and is not fully illustrated in FIGS. 1-4.

The distal joint element 100 includes a first boss 118 at a proximal end thereof, and the proximal joint element 102 includes a second boss 120 at a distal end thereof. In the first state the first and second bosses 118, 120 are disengaged so as to degrade ability of the distal joint element 100 to be articulated relative to the proximal joint element 102. The first and second bosses 118, 120 are spaced an axial or longitudinal distance apart from one another in the first state. In the second state the first and second bosses 118, 120 are no longer spaced a distance apart from one another. In the second state the first and second bosses 118, 120 are engaged at a pivot point 122 defined between the first and second bosses 118, 120 so as to allow the distal joint element 100 to be pivoted at the pivot point 122 relative to the proximal joint element 102 to articulate the distal joint element 100 relative to the proximal joint element 102. The pivot point 122 does not exist with the instrument in the first state. In this illustrated embodiment, the first and second bosses 118, 120 are engaged with the first boss 118 being seated in the second boss 120. The first and second bosses 118, 120 can be engaged in other ways, such as by the second boss 120 being seated in the first boss 118. The engagement of the first and second bosses 118, 120 at the joint 104 provides strength to the joint 104 for stable, controlled articulation.

The instrument is configured to move between the first and second states by moving the articulation cables 108, 110. With the instrument in the first state, an outer diameter D1 defined by the joint 104 is less than an inner diameter D2 of the cannula 106. A distal portion of the instrument including the joint 104 can thus move within the cannula 106 to be inserted into and removed from a patient's body. With the instrument in the first state, the articulation cables 108, 110 are slack and are configured to be pulled, e.g., moved proximally, to move the instrument to the second state. Pulling each of the articulation cables 108, 110 to move the articulation cables 108, 110 proximally as a unit causes the distal joint element 100 to move proximally relative to the proximal joint element 102 (and the elongate shaft if a separate element from the proximal joint element). The proximal movement is longitudinal or axial translation along the longitudinal axes 100A, 102A of the distal and proximal joint elements 100, 102. The distance between the distal and proximal elements 100, 102 decreases as the instrument moves from the first state toward the second state. This reduction in distance correspondingly decreases the amount of space between the distal and proximal elements 100, 102 that is available for the energy cable 112. Thus, as the instrument moves from the first state toward the second state, the energy cable 112 is forced to move and begins to buckle and move outside of the outer diameter D1 defined by the joint 104.

The engagement of the first and second bosses 118, 120 stops the proximal movement of the distal joint element 100, signaling that the instrument has reached the second state. In the second state, the energy cable 112 has moved outside of the outer diameter D1 defined by the joint 104 so as to increase an effective diameter of the joint 104 to a diameter D3 that is greater than the diameter D1 of the joint 104 in the first state and that is greater than the inner diameter D2 of the cannula 106. The energy cable 112 is thus no longer contained within the outer diameter D1 of the joint 104 with the instrument in the second state.

With the instrument in the second state, the articulation cables 108, 110 are tight and are configured to be pushed, e.g., moved distally, to move the instrument to the first state. Pushing each of the articulation cables 108, 110 causes the distal joint element 100 to move distally relative to the proximal joint element 102 (and relative to the elongate shaft if the shaft is a separate element from the proximal joint element). The distal movement is longitudinal or axial translation along the longitudinal axes 100A, 102A of the distal and proximal joint elements 100, 102. The amount of space between the distal and proximal joint elements 100, 102 increases as the instrument moves from the second state to the first state. The energy cable 112 can thus move into the increasing space to allow the energy cable 112 to be contained within the outer diameter D1 of the joint 104 with the instrument in the first state.

With the instrument in the second state and the articulation cables 108, 110 being tight, the distal link 100 can be articulated at the pivot point 122 relative to the proximal link 102 by pulling one of the first and second articulation cables 108, 110. The proximal movement of the pulled one of the first and second articulation cables 108, 110 causes the distal link 100 to move in pitch or yaw movement, depending on which one of the articulation cables 108, 110 is pulled.

The instrument can be moved between the first and second states any number of times.

Instead of the instrument being configured to move between the first and second states by moving the first and second articulation cables 108, 110, the instrument can be configured to move between the first and second states by moving the energy cable 112. In such an embodiment, the energy cable 112 is attached to the distal joint element 100, e.g., by being crimped, welded, glued, tied, etc. to the distal joint element 100. With the instrument in the first state, the energy cable 112 is configured to be pulled, e.g., moved proximally, to move the instrument to the second state similar to that discussed above with the distal joint element 100 being moved proximally. With the instrument in the second state, the energy cable 112 is configured to be pushed, e.g., moved distally, to move the instrument to the first state similar to that discussed above with the distal joint element 100 being moved distally. The energy cable 112 can be operatively coupled to an actuator configured to be actuated to cause the proximal or distal movement of the energy cable 112. For example, the actuator can include a lever at the instrument's housing. The lever can be configured to be moved in one direction, e.g., proximally, to cause proximal movement of the energy cable 112 by tensioning the cable 112 and moved in an opposite direction, e.g., distally, to cause distal movement of the energy cable 112 by slackening the cable 112. For another example, the actuator can include a knob at the instrument's housing. The knob can be configured to be rotated in one direction, e.g., clockwise, to cause proximal movement of the energy cable 112 by tensioning the cable 112 and moved in an opposite direction, e.g., counterclockwise, to cause distal movement of the energy cable 112 by slackening the cable 112.

Figure 5:
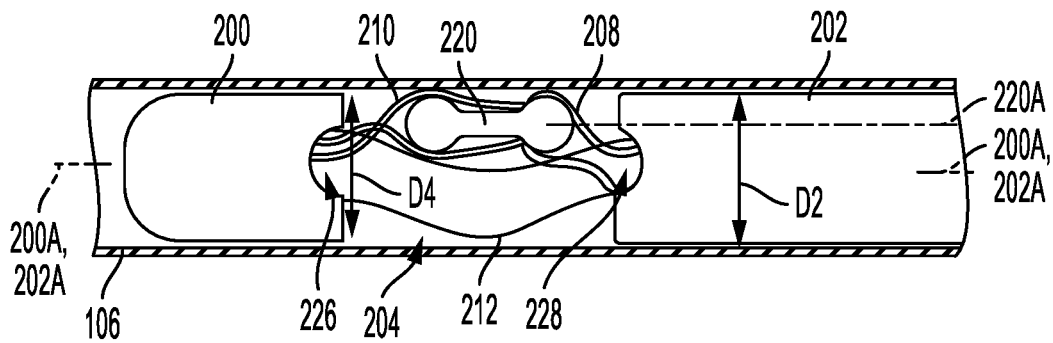
FIG. 5 is a top view of a distal portion of another embodiment of a surgical instrument in a first state and positioned in one embodiment of a cannula.
Figure 6:
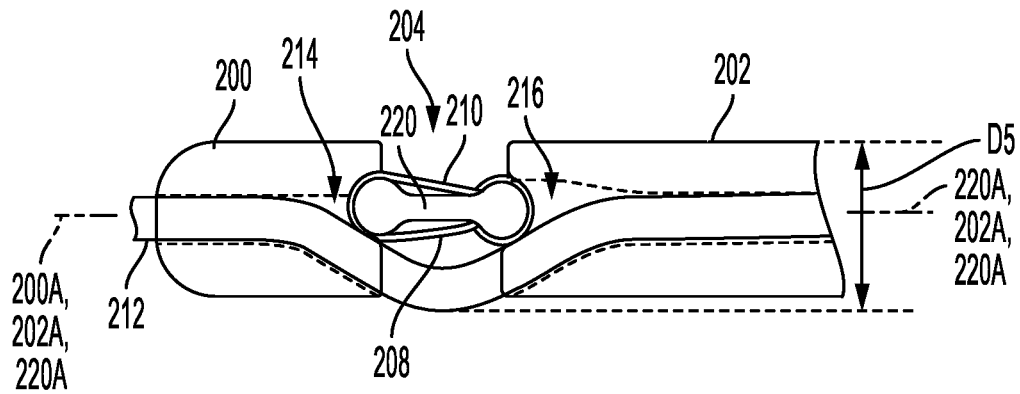
FIG. 6 is a top view of a distal portion of the surgical instrument of FIG. 5 in a second state and positioned outside the cannula.

FIGS. 5 and 6 illustrate another embodiment of a surgical instrument including a distal joint element 200, a proximal joint element 202, and a joint 204 between the distal and proximal joint elements 202, 204. The distal joint element 200 is configured to articulate relative to the proximal joint element 202 at the joint 204. The joint 204 is configured as an axially separable joint, as discussed further below. The surgical instrument is configured to move between first and second states similar to those discussed above with respect to the instrument of FIGS. 1-4. FIG. 5 shows the instrument in the first state. FIG. 5 also illustrate the cannula 106 through which the instrument is configured to be inserted into a body of a patient. The cannula 106 of FIG. 5 is the same cannula 106 as in FIGS. 1 and 2, but different cannulas can be used with the instruments, or no cannula may be used with either or both instruments. FIG. 6 shows the instrument in the second state. In FIG. 6 a distal portion of the instrument including the distal joint element 200 and the proximal joint element 202 has been advanced distally beyond the cannula 106. The cannula 106 is not shown in FIG. 6 since the cannula 106 is located proximal to the distal and proximal joint elements 200, 202, e.g., located to the right in the view of FIG. 6.

The distal joint element 200 is not articulated relative to the proximal joint element 102 in either of FIGS. 5 and 6. A longitudinal axis 200A of the distal joint element 200 is aligned with a longitudinal axis 202A of the proximal joint element 202 when the distal joint element 200 is not articulated relative to the proximal joint element 202, as shown in FIG. 5. When the distal joint element 300 is articulated relative to the proximal joint element 202, the longitudinal axis 200A of the distal joint element 200 is angled at a non-zero angle relative to the longitudinal axis 202A of the proximal joint element 202.

Figure 7:
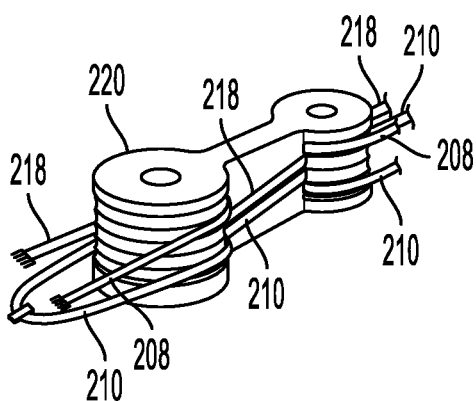
FIG. 7 is a perspective view of a knuckle and articulation cables of the surgical instrument of FIG. 6.

The instrument includes an articulation mechanism configured to be actuated to articulate the distal joint element 200 relative to the proximal joint element 202. The articulation mechanism in this illustrated embodiment includes a first articulation cable 208, a second articulation cable 210, and a third articulation cable 218. The third articulation cable 218 is obscured in FIGS. 5 and 6 but is shown in FIG. 7. Each of the articulation cables 208, 210, 218 extends between the proximal joint element 202 and the distal joint element 200 through the joint 204. A distal end of each of the articulation cables 208, 210, 218 is attached to the distal joint element 200, e.g., by being crimped, welded, glued, tied, etc. to the distal joint element 200. The articulation cables 208, 210, 218 are each flexible, which allow the articulation cables 208, 210, 218 to bend at the joint 204 when the distal joint element 200 is articulated. The instrument includes three articulation cables 208, 210, 218 in this illustrated embodiment, two for yaw movement (first and third cables 208, 218) and one for pitch movement (second cable 210), but a surgical instrument can include another number of articulation cables.

Each of the articulation cables 208, 210, 218 is operatively coupled to an articulation actuator of the instrument, similar to that discussed above regarding the articulation cables 108, 110 of FIGS. 1-4. The articulation actuator is configured to be actuated to cause articulation of the distal joint element 200 by moving one or more of the articulation cables 208, 210, 218, as discussed further below. Which one(s) of the articulation cables 208, 210, 218 are pulled and how much the one(s) are pulled affects how much and in which direction the distal joint element 200 articulates. The articulation actuator can have a variety of configurations and can be manually controlled or robotically controlled, as will be appreciated by a person skilled in the art.

The instrument includes an energy cable 212 configured to deliver energy to tissue in a body of a patient. The energy cable 212 extends between the proximal joint element 202 and the distal joint element 200 through the joint 204. The energy cable 212 is flexible, which allows the energy cable 212 to bend at the joint 204 when the distal joint element 200 is articulated. The energy cable 212 is a coaxial cable in this illustrated embodiment but can have other configurations. The energy cable 212 is a single cable in this illustrated embodiment but can include a plurality of cables.

The distal joint element 200 defines a distal tip of the instrument. The distal joint element 200 can have a variety of sizes, shapes, and configurations. The distal joint element 200 is cannulated in this illustrated embodiment, which allows the energy cable 212 to extend through an inner lumen 214 of the distal joint element 200 as shown in FIGS. 5 and 6. The distal joint element 200 has a blunt distal end in this illustrated embodiment, which may help prevent the distal joint element 200 from damaging tissue and/or other matter that contacts the blunt distal end.

The proximal joint element 202 can have a variety of sizes, shapes, and configurations. The proximal joint element 202 is cannulated in this illustrated embodiment, which allows the energy cable 212 and the first, second, and third articulation cables 208, 210, 218 to extend through an inner lumen 216 of the proximal joint element 202 as shown in FIGS. 5 and 6. The proximal joint element 202 can include a single inner lumen for the cables 208, 210, 212, 218 as in this illustrated embodiment, or can include two or more inner lumens each configured to receive therein at least one of the cables 208, 210, 212, 218.

The proximal joint element 202 in this illustrated embodiment is a distal portion of an elongate shaft of the instrument that extends distally from a proximal housing of the instrument. However, the proximal joint element 202 can instead be a separate element from the elongate shaft and be coupled to a distal end of the elongate shaft. Whether the proximal joint element 202 is a part of or is separate from the elongate shaft, the elongate shaft extends proximally (to the right in the view of FIGS. 5 and 6) and is not fully illustrated in FIGS. 5 and 6.

The instrument includes a knuckle 220 located at the joint 204 between the distal and proximal joint elements 200, 202. The knuckle 220 is shown as a standalone element in FIG. 8. The knuckle 220 is configured to facilitate articulation of the distal joint element 200 relative to the proximal joint element 202. The knuckle 220 is also configured to provide strength to the joint 204 in the second state for stable, controlled articulation.

The knuckle 220 includes a distal bulbous end 220d and a proximal bulbous end 220p. In this illustrated embodiment, the knuckle 220 is formed by a first stack of pulleys at the distal bulbous end 220d, a second stack of pulleys at the proximal bulbous end 220p, a first plate extending between and connecting the first and second pulley stacks at a top side of the knuckle 220, and a second plate extending between and connecting the first and second pulley stacks at a bottom side of the knuckle 220. The knuckle 220 defines a longitudinal axis 220A that extends between the distal and proximal bulbous ends 220d, 220p. The distal bulbous end 220d has a cylindrical distal face with first, second, and third grooves 222a, 222b, 222c formed therein that are configured to seat therein the first, second, and third articulation cables 208, 210, 218, respectively. The proximal bulbous end 220p has a cylindrical proximal face with first, second, and third grooves 224a, 224b, 224c formed therein that are configured to seat therein the first, second, and third articulation cables 208, 210, 218, respectively. FIGS. 6 and 7 show the first, second, and third articulation cables 208, 210, 218 seated in the first, second, and third distal grooves 222a, 222b, 222c, respectively, and in the first, second, and third proximal grooves 224a, 224b, 224c, respectively.

The knuckle 220 is configured to be in a first position relative to the distal and proximal joint elements 200, 202 in the first state and in a second position relative to the distal and proximal joint elements 200, 202 in the second state. In the first state, the knuckle 220 is not engaged with either of the distal and proximal joint elements 200, 202. In the second state, the knuckle 220 is engaged with each of the distal and proximal joint elements 200, 202.

The distal joint element 200 has a first concave cut-out 226 formed in a proximal end thereof, and the proximal joint element 202 has a second concave cut-out 228 formed in a distal end thereof. The first and second cut-outs 226, 228 are aligned with the longitudinal axes 200A, 202A of the distal and proximal joint elements 200, 202 in the first and second states. The first cut-out 226 has a size and shape corresponding to a size and shape of the knuckle's distal bulbous end 220d. The second cut-out 228 has a size and shape corresponding to a size and shape of the knuckle's proximal bulbous end 220p.

In the first state, as shown in FIG. 5, the knuckle 220 is not seated in either the first cut-out 226 or the second cut-out 228, and the longitudinal axis 220A of the knuckle 220 is offset from the longitudinal axes 200A, 202A of the distal and proximal joint elements 200, 202. The knuckle 220 not being engaged with either of distal and proximal joint elements 200, 202 in the first state degrades the ability of the distal joint element 200 to be articulated relative to the proximal joint element 202.

In the second state, as shown in FIG. 6, the distal bulbous end 220d of the knuckle 220 is seated in the first cut-out 226, the proximal bulbous end 220p of the knuckle 220 is seated in the second cut-out 228, and the longitudinal axis 220A of the knuckle 220 is aligned with the longitudinal axes 200A, 202A of the distal and proximal joint elements 200, 202. Thus, in the second state, the knuckle 220 joins together the distal and proximal joint elements 200, 202 and thereby allows the distal joint element 200 to pivot relative to the proximal joint element 202. The knuckle 220 at the joint 204 may provide for a greater range of articulation than the bosses 118, 120 at the joint 104 of FIGS. 1-4 because the knuckle 220 has fewer geometry limits than the bosses 118, 120.

The instrument is configured to move between the first and second states by moving the articulation cables 208, 210, 218. With the instrument in the first state, an outer diameter D4 defined by the joint 204 is less than the inner diameter D2 of the cannula 206. A distal portion of the instrument including the joint 204 can thus move within the cannula 206 to be inserted into and removed from a patient's body. With the instrument in the first state, the articulation cables 208, 210, 218 are slack and are configured to be pulled, e.g., moved proximally, to move the instrument to the second state. The articulation cables 208, 210, 218 in the slackened state are not seated in, or are only loosely seated in, the distal grooves 222a, 222b, 222c and the proximal grooves 224a, 224b, 224c, as shown in FIG. 5. The articulation cables 208, 210, 218 in the slackened state thus do not each extend along a surface of each of the distal grooves 222a, 222b, 222c and the proximal grooves 224a, 224b, 224c. Pulling each of the articulation cables 208, 210, 218 to move the articulation cables 208, 210, 218 proximally as a unit causes the distal joint element 200 (and thus the elongate shaft) to move proximally relative to the proximal joint element 202. The proximal movement is longitudinal or axial translation along the longitudinal axes 200A, 202A of the distal and proximal joint elements 200, 202. The distance between the distal and proximal elements 200, 202 decreases as the instrument moves from the first state toward the second state. This reduction in distance correspondingly decreases the amount of space between the distal and proximal elements 200, 202 that is available for the energy cable 212. Thus, as the instrument moves from the first state toward the second state, the energy cable 212 is forced to move and begins to buckle and move outside of the outer diameter D4 defined by the joint 204.

The energy cable 212 is contained within the outer diameter D4 of the joint 204 with the instrument in the second state. The slackened state of the articulation cables 208, 210, 218 in the first state allows the energy cable 212 to push the knuckle 220 off center such that the knuckle's longitudinal axis 220A is offset from the longitudinal axes 200A, 202A of the distal and proximal joint elements 200, 202 in the first state.

The engagement of the first and second cut-outs 226, 228 with the knuckle's distal and proximal bulbous ends 220d, 220p, respectively, stops the proximal movement of the distal joint element 200, signaling that the instrument has reached the second state. In the second state, the energy cable 212 has moved outside of the outer diameter D4 defined by the joint 204 so as to increase an effective diameter of the joint 204 to a diameter D5 that is greater than the diameter D4 of the joint 204 in the first state and that is greater than the inner diameter D2 of the cannula 206. The energy cable 212 is thus no longer contained within the outer diameter D4 of the joint 204 with the instrument in the second state. The energy cable 212 moving out of the joint 204 as the instrument moves from the first state to the second state allows the knuckle 220 to move, via the force being applied to the articulation cables 208, 210, 218, relative to the distal and proximal joint elements 200, 202 from the knuckle's offset position (FIG. 5) to the knuckle's aligned position (FIG. 6) in which the knuckle 220 is seated in the joint elements' cut-outs 226, 228.

With the instrument in the second state, the articulation cables 208, 210, 218 are tight and are configured to be pushed, e.g., moved distally, to move the instrument to the first state. The articulation cables 208, 210, 218 in the tightened state are each seated in the distal grooves 222a, 222b, 222c and the proximal grooves 224a, 224b, 224c. The articulation cables 208, 210, 218 in the tightened state thus each extend along a surface of each of the distal grooves 222a, 222b, 222c and the proximal grooves 224a, 224b, 224c, as shown in FIGS. 6 and 7. Pushing each of the articulation cables 208, 210, 218 causes the distal joint element 200 to move distally relative to the proximal joint element 202 (and thus relative to the elongate shaft). The distal movement is longitudinal or axial translation along the longitudinal axes 200A, 202A of the distal and proximal joint elements 200, 202. The amount of space between the distal and proximal joint elements 200, 202 increases as the instrument moves from the second state to the first state. The knuckle 220 thus becomes unseated from the joint elements' cut-outs 226, 228. The energy cable 212 moves into the increasing space between the distal and proximal joint elements 200, 202 to allow the energy cable 212 to be contained within the outer diameter D4 of the joint 204 with the instrument in the first state. The energy cable 212 moving into the joint 204 pushes the knuckle 220 to its offset position.

With the instrument in the second state and the articulation cables 208, 210, 218 being tight, the distal joint element 200 can be articulated relative to the proximal joint element 202 by pulling selected one(s) of the first, second, and third articulation cables 208, 210, 218. The proximal movement of the first and third articulation cables 208, 218 causes the distal joint element 200 to move in yaw movement, and the proximal movement of the second articulation cable 210 causes the distal joint element 200 to move in pitch movement.

The instrument can be moved between the first and second states any number of times.

Figure 8:
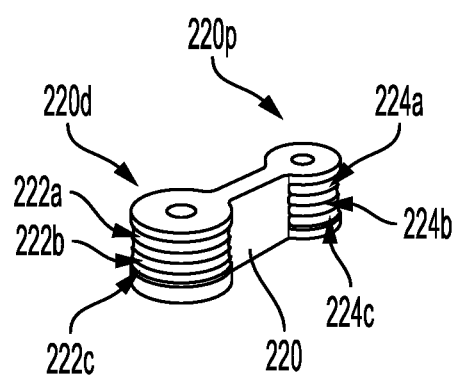
FIG. 8 is a perspective view of the knuckle of FIG. 7.
Figure 9:
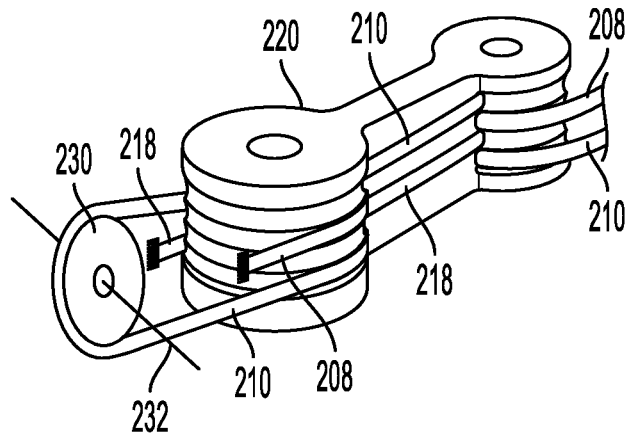
FIG. 9 is a perspective view of another embodiment of a knuckle and articulation cables.

FIG. 8 illustrates one embodiment of the articulation cables' routing through the knuckle 220. In this illustrated embodiment, each of the articulation cables 208, 210, 218 is attached directly to the distal joint element 200. FIG. 9 illustrates another embodiment of the articulation cables' routing through the knuckle 220. In this illustrated embodiment, the first and third articulation cables 208, 218, e.g., the yaw cables, are each attached directly to the distal joint element 200, and the second articulation cable 210, e.g., the pitch cable, is routed along a pulley 230 that is attached to the distal joint element 200 via a pin 232.

Figure 10:
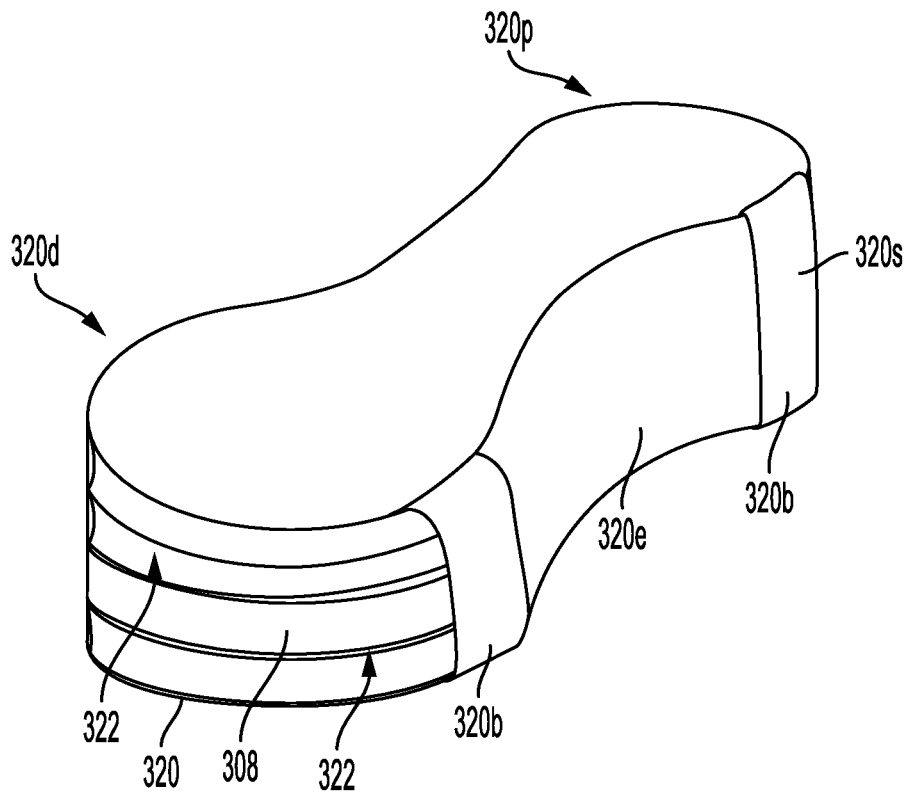
FIG. 10 is a perspective view of yet another embodiment of a knuckle and an articulation cable.

FIG. 10 illustrates another embodiment of a knuckle 320. The knuckle 320 is generally configured and used similar to the knuckle 220 of FIGS. 5-9 and includes a distal bulbous end 320d, a proximal bulbous end 320p, and top and bottom plates. In this illustrated embodiment, the knuckle 320 includes a shield 320s. The shield 320s is configured to, in the first state, hold each articulation cable 308 of the instrument near its groove 322 at the bulbous distal end 320d and its groove (obscured in FIG. 10) at the bulbous proximal end 320p. As the instrument moves from the first state to the second state, the shield 320s is configured to help ensure that the articulation cable 308 is near its associated grooves and thus properly seats in its associated grooves at the proximal and distal ends 320p, 320d of the knuckle 320 so the articulation cable 308 can be smoothly moved therein to effect articulation. In the second state, the tightened state of the articulation cable 308 holds the articulation cable 308 within its grooves at the proximal and distal ends 320p, 320d. Only one articulation cable 308 is shown in this illustrated embodiment that is configured to be seated in one groove at the proximal and distal ends 320p, 320d of the knuckle 320, but a plurality of articulation cables can be used and can each be configured to be seated in a groove at the proximal and distal ends 320p, 320d of the knuckle 320.

The shield 320s extends longitudinally along each opposed side of the knuckle 320 between first and second shield bars 320b on each side of the knuckle 320 that extend between top and bottom sides of the knuckle 320. In other embodiments, the shield 320s includes the first and second shield bars 320b without including an extension 320e extending therebetween. In other embodiments, the shield 320s does not include the extension 320e but includes another number of shield bars 320b, e.g., one bar 320b centered along each opposed side of the knuckle 320, three or more bars 320b positioned along each opposed side of the knuckle 320, etc.

The shield 320s can have a smooth inner surface, or the shield's inner surface can have a surface feature thereon configured to help separate and constrain each articulation cable 308 to facilitate seating of each articulation cable 308 in its grooves at the proximal and distal ends 320p, 320d of the knuckle 320. The shield's inner surface is obscured in FIG. 10.

Figure 11:
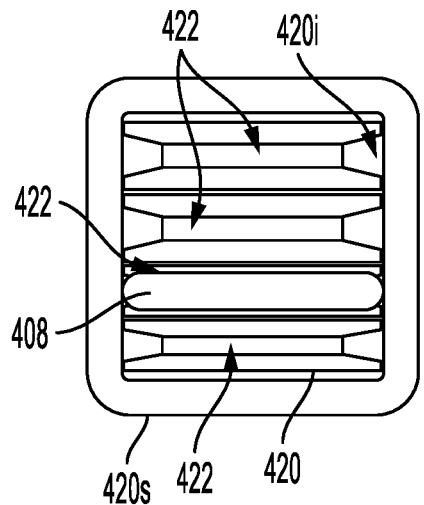
FIG. 11 is an end view of another embodiment of a knuckle and an articulation cable.
Figure 12:
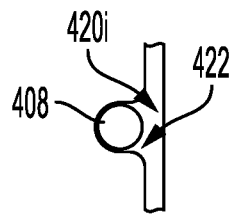
FIG. 12 is cross-sectional view of a portion of the knuckle and articulation cable of FIG. 11.

FIG. 11 shows another embodiment of a knuckle 420 that is generally configured and used similar to the knuckle 220 of FIGS. 5-9. The knuckle 420 in this illustrated embodiment includes a shield 420s that is configured and used similar to the shield 320s of FIG. 10 and that has a smooth inner surface 420i. The shield 420s includes four grooves 422 at its distal end and four grooves at its proximal end (obscured in FIG. 11). Only one articulation cable 408 is shown in FIG. 11, but up to three additional articulation cables can be used with the shield 420s since four grooves are provided at the shield's distal and proximal ends. FIG. 12 shows the second state in which the articulation cable 408 is seated in its groove 422. FIG. 12 also shows that the groove 422 has a diameter that corresponds to a diameter of the articulation cable 408, which may help facilitate seating and smooth sliding movement of the articulation cable 408 therein. In the various knuckle embodiments described herein, the groove(s) of the knuckle can similarly each have a diameter that corresponds to a diameter of an articulation cable configured to be seated therein.

Figure 13:
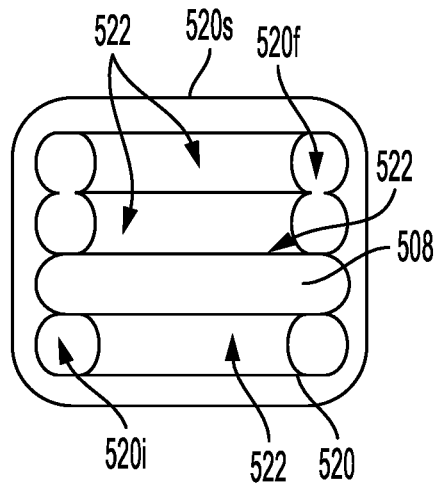
FIG. 13 is an end view of still another embodiment of a knuckle and an articulation cable.

FIG. 13 shows another embodiment of a knuckle 520 that is generally configured and used similar to the knuckle 220 of FIGS. 5-9. The knuckle 520 in this illustrated embodiment includes a shield 520s that is configured and used similar to the shield 320s of FIG. 10 and that has an inner surface 520i including a surface feature 520f. The surface feature 520f in this illustrated embodiment includes channels each associated with one of the grooves 522 of the knuckle 520. The shield 520s includes four grooves 522 at its distal end, eight associated channels at its distal end (four channels in each opposed side of the shield 520s) and four grooves and eight associated channels at its proximal end (obscured in FIG. 13). Only one articulation cable 508 is shown in FIG. 13, but up to three additional articulation cables can be used with the shield 520s since four grooves and eight associated channels are provided at each of the shield's distal and proximal ends.

Figure 14:
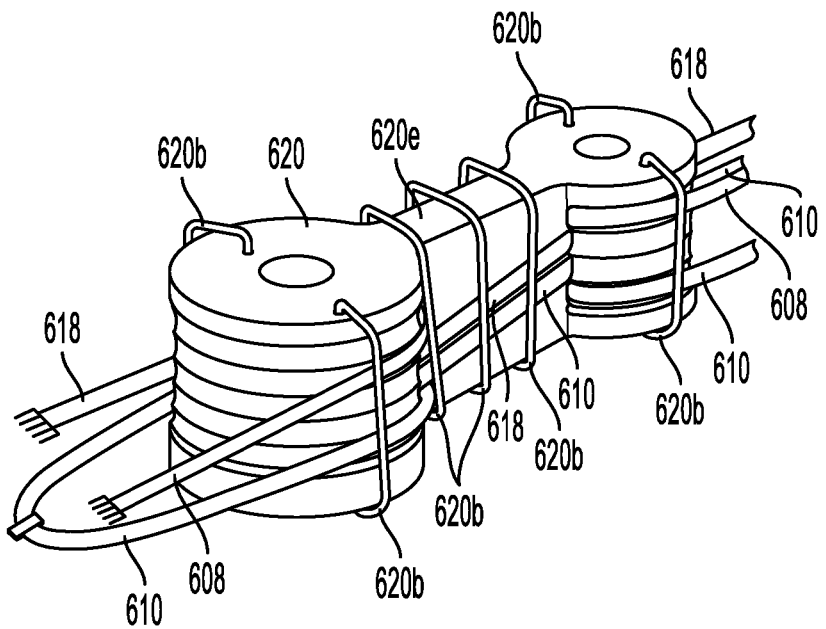
FIG. 14 is a perspective view of yet another embodiment of a knuckle and articulation cables.

FIG. 14 illustrates another embodiment of a knuckle 620 that is generally configured and used similar to the knuckle 220 of FIGS. 5-9. The knuckle 620 in this illustrated embodiment includes a shield 620s that is configured and used similar to the shield 320s of FIG. 10. The shields 320s, 420s, 520s of FIGS. 10-13 are rigid. The shield 620s of FIG. 14 is flexible. The shield 620s being flexible allows the shield 620s to flex if needed to avoid interfering with any other functionality of the instrument, such as articulation when the instrument is in the second state and the articulation cables 608, 610, 618 seated in the knuckle's grooves variously move to articulate the instrument's distal link. The knuckle 620 is used with three articulation cables 608, 610, 618 in this illustrated embodiment, similar to the knuckle 320 and the three articulation cables 308, 310, 318 discussed above, but another number of articulation cables can be used.

The shield 620s extends between top and bottom sides of the knuckle 620 similar to the shield bars 320b discussed above except instead of being in the form of rigid bars 320b, the shield 620s of FIG. 14 is in the form of flexible bands 620b similar to elastic or rubber bands. Each opposed side of the knuckle 620 includes five flexible bands 620b in this illustrated embodiment, but another number of flexible bands 620b can be used. The flexible bands 620b located at the knuckle's extension 620e are continuous bands that extend entirely around the knuckle 620. The flexible bands 620b located at the knuckle's distal and proximal bulbous ends 620d, 620p do not extend entirely around the knuckle 620, which may facilitate manufacturing and/or help a rotational alignment mechanism (if present, discussed further below) engage the distal and proximal bulbous ends 620d, 620p without interference from the flexible bands 620b. In other embodiments, the flexible bands 620 can have another combination of extending fully around the knuckle 620 or not, including all of the flexible bands 620 extending fully around the knuckle 620 or none of the flexible bands 620b extending fully around the knuckle 620.

A surgical instrument including a knuckle can be configured to maintain a rotational alignment of the knuckle relative to the instrument's distal and proximal joint elements. Maintaining the knuckle's rotational alignment can help ensure that the knuckle properly seats in the distal and proximal joint elements' cut-outs.

Figure 15:
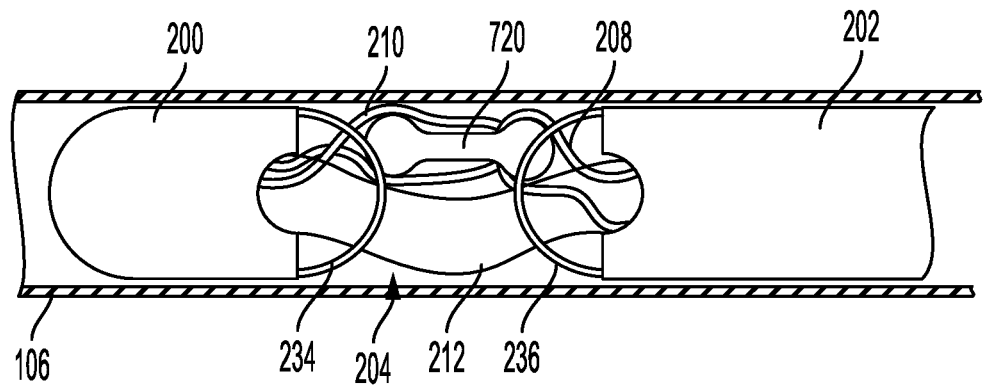
FIG. 15 is a top view of a distal portion of yet another embodiment of a surgical instrument in a first state and positioned in one embodiment of a cannula.
Figure 16:
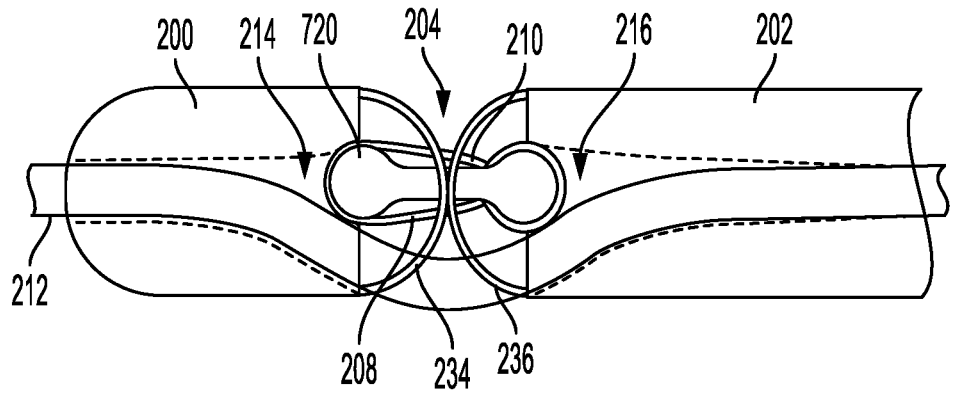
FIG. 16 is a top view of a distal portion of the surgical instrument of FIG. 15 in a second state and positioned outside the cannula.
Figure 17:
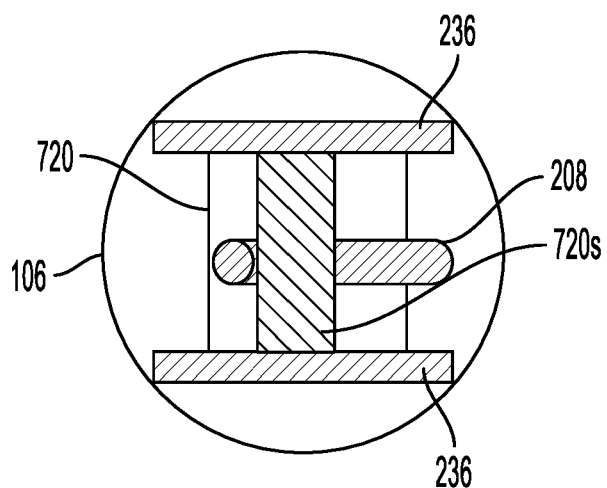
FIG. 17 is a cross-sectional view of a portion of the surgical instrument and the cannula of FIG. 15.
Figure 18:
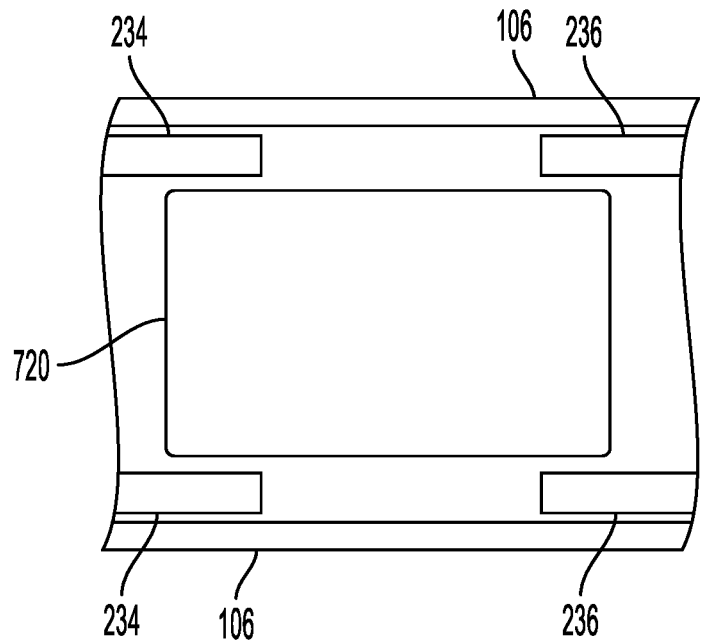
FIG. 18 is another cross-sectional view of a portion of the surgical instrument and the cannula of FIG. 15.

FIGS. 15-18 illustrate one embodiment of a surgical instrument including a rotational alignment mechanism. The rotational alignment mechanism is illustrated with respect to the surgical instrument of FIGS. 5 and 6 including another embodiment of a knuckle 720, but other embodiments can similarly include a rotational alignment mechanism. The instrument in FIGS. 15-18 is the same as the instrument of FIGS. 5 and 6 except for the different knuckle 720 and the addition of the rotational alignment mechanism. The knuckle 720 in this illustrated embodiment is generally configured and used similar to the knuckle 320 of FIG. 10 and includes a shield 720s at each of its proximal and distal ends in the form of a shield bar. FIGS. 15, 17, and 18 show the instrument in the first state and disposed in the cannula 106, similar to FIG. 5, and FIG. 16 shows the instrument in the second state with a distal portion of the instrument extending distally beyond the cannula 106, similar to FIG. 6. The rotational alignment mechanism includes a first pair of extensions 234 extending proximally from the distal joint element 200 into the joint 204 and a second pair of extensions 236 extending distally from the proximal joint element 2002 into the joint 204. Only one of the first extensions 234 and only one of the second extensions 236 is visible in FIGS. 15 and 16. The first and second extensions 234, 236 each have a half-disc or semi-circular shape in this illustrated embodiment, but other shapes are possible.

A surgical instrument including distal and proximal joint elements can include a force mechanism configured to provide stability to the instrument. As mentioned above, the instrument in the first state is configured to be advanced into a patient's body, such as through a cannula. The force mechanism being configured to provide stability to the instrument may help facilitate movement of the instrument's joint into and out of the patient's body by adding stability or rigidity to the joint with the instrument in the first state.

Figure 19:
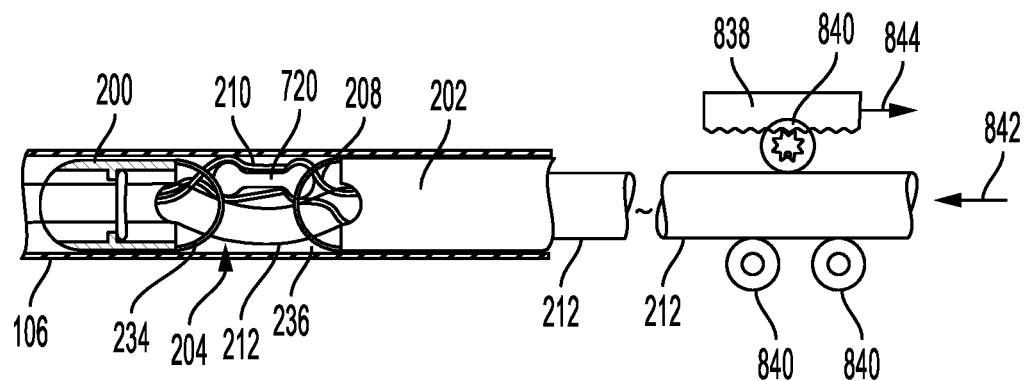
FIG. 19 is a top view of a portion of yet another embodiment of a surgical instrument in a first state and positioned in one embodiment of a cannula.
Figure 20:
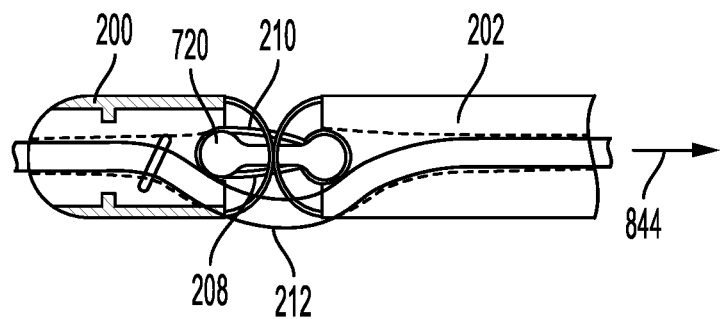
FIG. 20 is a top view of a distal portion of the surgical instrument of FIG. 19 in a second state and positioned outside the cannula.

FIGS. 19 and 20 illustrate one embodiment of a surgical instrument including a force mechanism. The force mechanism is illustrated with respect to the surgical instrument of FIGS. 15-18, but other embodiments can similarly include a force mechanism. The instrument in FIGS. 19 and 20 is the same as the instrument of FIGS. 15-18 except for the addition of the force mechanism. FIG. 19 shows the instrument in the first state and disposed in the cannula 106, similar to FIG. 15, and FIG. 20 shows the instrument in the second state with a distal portion of the instrument extending distally beyond the cannula 106, similar to FIG. 16. The force mechanism in this illustrated embodiment includes a rack 838 and pinion 840. The rack 838 and pinion 840 are configured to urge the energy cable 212 distally (shown by arrow 842) in the first state. The distally directed force provided by the rack 838 and pinion 840 can be overcome by the proximal force (shown by arrow 844) urging the distal link 200 proximally in the second state.

Over time as a surgical instrument is used in each of a plurality of surgical procedures, flexible members of the instrument, such as articulation cables, may change from their initial state (e.g., their state at a time of manufacturing or at first use of the surgical instrument in a surgical procedure) due to the repeated use thereof. The change can include, for example, any one or more of a change in length (e.g., an increase in length due to being stretched out and/or twisted during use), a change in spring rate (e.g., a decrease in spring rate due to being stretched out and/or twisted during use), and a change in flexibility (e.g., an increase in flexibility due to being stretched out and/or twisted during use). The change results in less precisely controlled functioning of the instrument over time, such as less precisely controlled articulation effected using one or more articulation cables. Additionally, as mentioned above, the surgical instrument described herein that include at least one flexible member, e.g., at least one articulation cable, can be coupled to a robotic surgical system. Robotic surgical systems can allow for more intuitive hand movements by maintaining natural eye-hand axis. One drawback with robotic surgical systems, however, is that a starting position of the surgical instrument's joint changes over time due to the flexing of flexible member(s) that over time creates some degree of slack in the flexible members. Instrument functions, such as articulation using flexible articulation member(s), thus becomes less precisely controlled over time, resulting in the instrument not being positioned as precisely as desired. Homing is further discussed in, for example, U.S. Pat. No. 10,856,942 entitled "System And Method For Closed-Loop Surgical Tool Homing" issued Dec. 8, 2020 and U.S. Pat. No. 10,149,726 entitled "Methods, Systems, And Devices For Initializing A Surgical Tool" issued Dec. 11, 2018, which are hereby incorporated by reference in their entireties.

The surgical instruments described herein including a separable joint can be homed to account for joint changes over time. Homing of surgical instruments typically occurs in a cannula through which the surgical instrument is being advanced. However, homing may not reliably occur in a cannula with the surgical instruments described herein including a separable joint because the joint is separated in the first state of the instrument that the instrument is in within a cannula, as discussed above. The surgical instruments described herein including a separable joint can be homed outside of a cannula.

Figure 21:
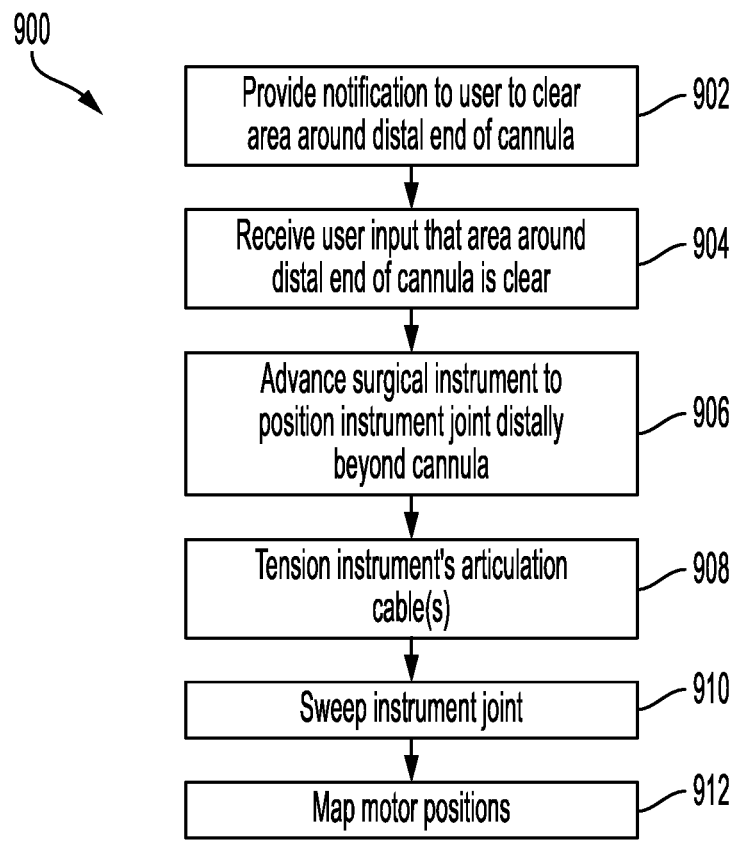
FIG. 21 is a flowchart showing one embodiment of a homing process for a surgical instrument.

FIG. 21 illustrates one embodiment of a homing process 900 for homing a surgical instrument including a joint as described herein. In an exemplary embodiment, the process 900 is performed during performance of a surgical procedure or in preparation of performance of a surgical procedure. The process 900 in this illustrated embodiment is performed by a robotic surgical system to which the surgical instrument is releasably coupled. The robotic surgical system drives various functions of the surgical instrument using a motor of the robotic surgical system that is operably coupled to the surgical instrument, e.g., to the surgical instrument's proximal housing.

In the process 900, the robotic surgical system provides 902 a notification to a user of the surgical instrument to clear an area around a distal end of a cannula through which the surgical instrument is or will be inserted. The notification can be, for example, a text and/or graphical message on a display of the robotic surgical system. The robotic surgical system receives 904 an input from the user, e.g., an input to a keyboard, a touchscreen, etc., that the area around the distal end of the cannula is clear. In response to receiving 904 the user input, the robotic surgical system advances 906 the surgical instrument through the cannula until a distal portion of the instrument including the instrument's joint has been advanced distally beyond the cannula's distal end. If the instrument is already so positioned when the user input is received 904, the robotic surgical system need not advance 906 the instrument. The robotic surgical system then tensions 908 the instrument's articulation cable(s) to re-locate the joint. The robotic surgical system then sweeps 910 the joint until a spike in torque indicates a mechanical limit at each extreme and maps 912 motor positions at each torque spike to map the home position.

In another embodiment of a homing process, the process is similar to the process 900 of FIG. 21 except that a camera, e.g., a scoping device including an image sensor, a dedicated imaging device, etc., in operative communication with the robotic surgical system uses machine vision to ensure that the surgical instrument does not contact an obstacle, e.g., another surgical instrument, tissue, etc., at least during the tensioning 908 and the sweeping 910. Ensuring that the surgical instrument does not contact an obstacle may help ensure that the articulation cable(s) are fully tensioned 908 and that the instrument reaches each extreme, thereby helping to ensure that the motor positions are accurately mapped 912.

In another embodiment of a homing process, the process is similar to the process 900 of FIG. 21 except that the joint is only swept 910 in a direction in which an obstacle is detected, such as with a sensor at a distal end of the surgical instrument and/or a sensor at a distal end of another surgical device at the same surgical site as the surgical instrument. The direction can be a single direction or can be more than one direction. If an obstacle is detected, the robotic surgical system can prompt the user of the surgical instrument to move the obstacle out of the way and/or to reposition the surgical instrument. The robotic surgical system then receives an input from the user, e.g., an input to a keyboard, a touchscreen, etc., that the obstacle has been cleared. The homing process can then resume.

Figure 22:
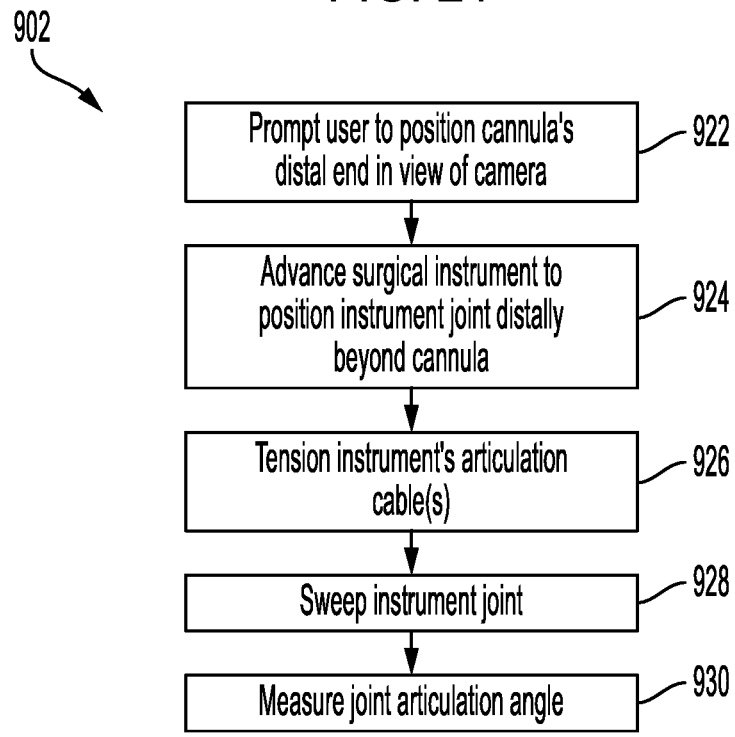
FIG. 22 is a flowchart showing another embodiment of a homing process for a surgical instrument.

FIG. 22 illustrates another embodiment of a homing process 920 for homing a surgical instrument including a joint as described herein. In an exemplary embodiment, the process 920 is performed during performance of a surgical procedure or in preparation of performance of a surgical procedure. The process 920 in this illustrated embodiment is performed by a robotic surgical system to which the surgical instrument is releasably coupled.

In the process 920, the robotic surgical system prompts 922 a user of the surgical instrument to position a distal end of a cannula through which the surgical instrument is or will be inserted into view of a camera, e.g., a scoping device including an image sensor, a dedicated imaging device, etc., in operative communication with the robotic surgical system. In response to the camera visualizing the cannula's distal end, the robotic surgical system advances 924 the surgical instrument through the cannula until a distal portion of the instrument including the instrument's joint has been advanced distally beyond the cannula's distal end. The camera visualizing the cannula's distal end can be detected in a variety of ways, such as by using image recognition or using fiducial markers on the cannula. The robotic surgical system then tensions 926 the instrument's articulation cable (s) to re-locate the joint. The robotic surgical system then sweeps 928 the joint through a portion of the joint's travel while visualizing the joint using the camera. The robotic surgical system measures 930 the actual joint articulation angle as seen via the visualization of the joint's travel. The measured 930 articulated angle acts as an absolute reference, completing the homing.

Figure 23:
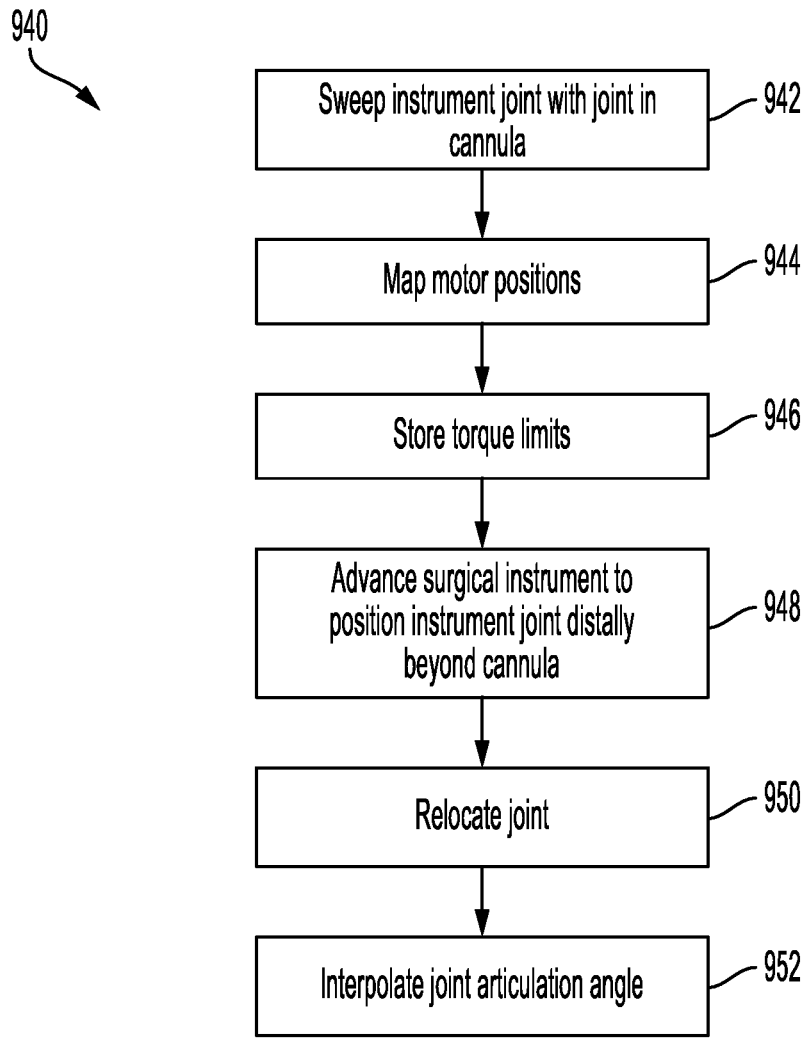
FIG. 23 is a flowchart showing yet another embodiment of a homing process for a surgical instrument.

FIG. 23 illustrates another embodiment of a homing process 940 for homing a surgical instrument including a joint as described herein. In this illustrated embodiment, part of the homing process 940 occurs with the joint located in a cannula. In an exemplary embodiment, the process 940 is performed during performance of a surgical procedure or in preparation of performance of a surgical procedure. The process 940 in this illustrated embodiment is performed by a robotic surgical system to which the surgical instrument is releasably coupled. The robotic surgical system drives various functions of the surgical instrument using a motor of the robotic surgical system that is operably coupled to the surgical instrument, e.g., to the surgical instrument's proximal housing.

In the process 940, with the joint of the surgical instrument located in the cannula, the robotic surgical system sweeps 942 the joint until a spike in torque indicates a mechanical limit at each extreme and maps 944 motor positions at each torque spike. The robotic surgical system stored 946 the torque limits, e.g., in a memory of the robotic surgical system. The robotic surgical system then advances 948 the surgical instrument through the cannula until a distal portion of the instrument including the instrument's joint has been advanced distally beyond the cannula's distal end. The robotic surgical system then relocates 950 the joint, e.g., using a camera (e.g., a scoping device including an image sensor, a dedicated imaging device, etc.) operatively coupled to the robotic surgical system. The robotic surgical system then interpolates 952 the articulation angles of the joint located distally beyond the cannula. The interpolation 952 can be performed, for example, by passing the stored 946 torque limits through a lookup table, which may be stored in a memory of the robotic surgical system, storing predetermined, e.g., lab measured, separated joint end of travel motor angles and their equivalent predetermined, e.g., lab measured, relocated joint angles.

Figure 24:
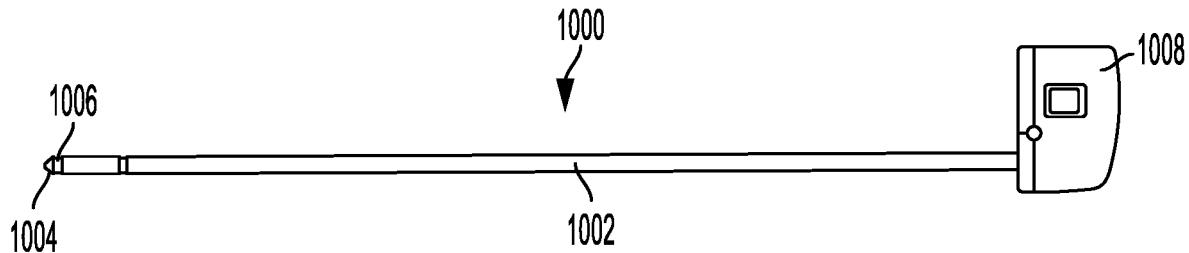
FIG. 24 is a side view of one embodiment of a surgical instrument including a separable joint.

FIG. 24 illustrates one embodiment of a surgical instrument 1000 configured to have first and second states as described herein. The instrument 1000 in this illustrated embodiment is configured to releasably couple to a robotic surgical system. The surgical instrument 1000 includes an elongate shaft 1002, a distal tip 1004, a joint 1006 between the shaft 1002 and the tip 1004, and a housing 1008 coupled to a proximal end of the shaft 1002. The housing 1008 includes various components, gears, actuators, etc., configured to control the operation various features of the instrument 1000, e.g., energy delivery, articulation, shaft 1002 rotation, etc. The housing 1008 includes coupling features configured to allow the releasable coupling of the instrument 1000 to the robotic surgical system. The housing 1008 can be configured to be releasably coupled to a generator configured to generate energy deliverable by the instrument. The robotic surgical system includes a controller configured to control the instrument 1000 releasably coupled thereto. Various embodiments of robotic surgical systems and releasably coupling an instrument housing and a robotic surgical system are further described in International Pat. Pub. No. WO 2014/151952 entitled "Compact Robotic Wrist" filed Mar. 13, 2014, International Pat. Pub. No. WO 2014/151621 entitled "Hyperdexterous Surgical System" filed Mar. 13, 2014, U.S. Pat. No. 10,932,808 entitled "Methods, Systems, And Devices For Controlling Electrosurgical Tools" issued Mar. 2, 2021, U.S. Pat. No. 10,149,726 entitled "Methods, Systems, And Devices For Initializing A Surgical Tool" issued Dec. 11, 2018, and U.S. Pat. No. 10,016,246 entitled "Methods, Systems, And Devices For Controlling A Motor Of A Robotic Surgical Systems" issued Jul. 10, 2018, which are hereby incorporated by reference in their entireties.

Instead of being controlled by a robotic surgical system, a surgical instrument configured to have first and second states as described herein can be configured to handheld and manually controlled. Such an instrument can similarly include an elongate shaft, a distal tip, a joint between the shaft and the tip, and a housing coupled to a proximal end of the shaft. The housing is configured to be handheld and manually manipulated, and can include a controller and various components, gears, actuators, etc., configured to control the operation various features of the instrument, e.g., energy delivery, articulation, shaft rotation, etc. The housing can be configured to be releasably coupled to a generator configured to generate energy deliverable by the instrument.

The devices disclosed herein can be designed to be disposed of after a single use, or they can be designed to be used multiple times. In either case, however, the device can be reconditioned for reuse after at least one use. Reconditioning can include any combination of the steps of disassembly of the device, followed by cleaning or replacement of particular pieces and subsequent reassembly. In particular, the device can be disassembled, and any number of the particular pieces or parts of the device can be selectively replaced or removed in any combination. Upon cleaning and/or replacement of particular parts, the device can be reassembled for subsequent use either at a reconditioning facility, or by a surgical team immediately prior to a surgical procedure. Those skilled in the art will appreciate that reconditioning of a device can utilize a variety of techniques for disassembly, cleaning/replacement, and reassembly. Use of such techniques, and the resulting reconditioned device, are all within the scope of the present application.

It can be preferred that the devices disclosed herein be sterilized before use. This can be done by any number of ways known to those skilled in the art including beta or gamma radiation, ethylene oxide, steam, and a liquid bath (e.g., cold soak). An exemplary embodiment of sterilizing a device including internal circuitry is described in more detail in U.S. Pat. No. 8,114,345 issued Feb. 14, 2012 and entitled "System And Method Of Sterilizing An Implantable Medical Device."

One skilled in the art will appreciate further features and advantages of the devices, systems, and methods based on the above-described embodiments. Accordingly, this disclosure is not to be limited by what has been particularly shown and described, except as indicated by the appended claims. All publications and references cited herein are expressly incorporated herein by reference in their entirety for all purposes.

The present disclosure has been described above by way of example only within the context of the overall disclosure provided herein. It will be appreciated that modifications within the spirit and scope of the claims may be made without departing from the overall scope of the present disclosure.

What is claimed is:

1. A surgical system, comprising:
   a joint of a surgical instrument, the joint including a distal joint element and a proximal joint element, and the joint being configured to be inserted into a body of a patient; and
   a plurality of articulation cables of the surgical instrument extending between and within the distal and proximal joint elements;
   wherein the joint is movable between a first state, in which the proximal and distal joint elements are a first distance apart from one another and in which the articulation cables cannot be actuated to articulate the distal joint element relative to the proximal joint element, and a second state, in which the proximal and distal joint elements are a second distance apart from one another and in which the articulation cables can be actuated to articulate articulated the distal joint element relative to the proximal joint element; and
   wherein the second distance is less than the first distance.

2. The surgical system of claim 1, wherein in the first state the articulation cables are slack; and
   in the second state the articulation cables are tight.

3. The surgical system of claim 1, further comprising a second cable of the surgical instrument, the second cable extending between and within the distal and proximal joint elements;
   wherein in the first state the second cable is contained within an outer diameter of the joint; and
   in the second state the second cable is not contained within the outer diameter of the joint.

4. The surgical system of claim 3, wherein the movement of the joint from the first state to the second state is configured to cause the second cable to buckle outside of the outer diameter of the joint.

5. The surgical system of claim 4, wherein the movement of the joint from the second state to the first state is configured to enable the second cable to return to being contained within the outer diameter of the joint.

6. The surgical system of claim 3, further comprising a cannula having an inner lumen in which the joint is configured to be advanced into the body of the patient;
wherein the inner lumen defines an inner diameter of the cannula; and
the outer diameter of the joint is less than the inner diameter of the cannula.

7. The surgical system of claim 1, wherein the distal joint element includes a first boss at a proximal end thereof;
the proximal joint element includes a second boss at a distal end thereof;
in the first state the first and second bosses are disengaged so as to prevent the distal joint element from being articulated relative to the proximal joint element; and
in the second state the first and second bosses are engaged at a pivot point defined between the first and second bosses so as to allow the distal joint element to be pivoted at the pivot point relative to the proximal joint element to articulate the distal joint element relative to the proximal joint element.

8. The surgical system of claim 1, further comprising a knuckle of the surgical instrument, the knuckle being disposed between the first joint element and the second joint element;
wherein the joint defines a first longitudinal axis, and the knuckle defines a second longitudinal axis;
in the first state the second longitudinal axis is offset from the first longitudinal axis; and
in the second state the second longitudinal axis is aligned with the first longitudinal axis.

9. The surgical system of claim 8, wherein a first cut-out is formed in a proximal end of the distal joint element;
a second cut-out is formed in a distal end of the proximal joint element;
in the first state the knuckle is not seated in the first cut-out or the second cut-out; and
in the second state the knuckle is seated in the first cut-out and in the second cut-out.

10. The surgical system of claim 9, wherein in the first state the articulation cables are slack and do not extend along a surface of the knuckle;
in the second state the articulation cables are tight and do extend along the surface of the knuckle; and
the actuation of the articulation cables is configured to cause the knuckle to pivot at least one of the first cut-out, relative to the distal joint element, and the second cut-out, relative to the proximal joint element.

11. The surgical system of claim 8, wherein in the first state the articulation cables are slack and are not seated in a groove formed in the knuckle;
in the second state the articulation cables are tight and are seated in the groove; and
the knuckle includes a shield configured to, in the first state, hold the articulation cables near the groove.

12. The surgical system of claim 8, wherein the distal and proximal joint elements are configured to maintain a rotational alignment of the knuckle relative to the distal and proximal joint elements.

13. The surgical system of claim 8, further comprising an energy cable of the surgical instrument, the energy cable extending between and within the distal and proximal joint elements, and the energy cable being configured to deliver energy to tissue in the body of the patient;
a rack and pinion of the surgical instrument, the rack and pinion configured to, in the first state, urge the energy cable distally.

14. The system surgical of claim 1, further comprising a cannula having an inner lumen in which the surgical instrument is configured to be advanced into the body of the patient; and
further comprising a controller;
wherein the controller is configured to home the surgical instrument with the surgical instrument positioned in the inner lumen of the cannula and the joint positioned distal to the cannula and in the second state.

15. A surgical method, comprising:
with the surgical instrument of the surgical system of claim 1 being in the first state, advancing an elongate shaft of the surgical instrument into a body of a patient with the distal joint element that is distal to the proximal joint element leading the advancement of the surgical instrument into the body of the patient, wherein in the first, an energy cable of the surgical instrument is contained within an outer diameter of the elongate shaft;
with the the distal joint element in the body of the patient, moving the surgical instrument from the first state to the second state, in which the energy cable is contained within the outer diameter of the elongate shaft and in which the elongate shaft and the distal joint element are closer to one another than in the first state; and
with the surgical instrument in the second configuration state, causing the energy cable to deliver energy to tissue of the patient.

16. The method of claim 15, wherein, with the surgical instrument in the first state, the energy cable cannot deliver energy to tissue of the patient.

17. The method of claim 15, wherein moving the surgical instrument from the first state to the second state causes the energy cable to buckle outside of the outer diameter of the elongate shaft.

18. The method of claim 17, further comprising moving the surgical instrument from the second state to the first state, thereby causing the energy cable to return to being contained within the outer diameter of the elongate shaft.

19. The method of claim 15, wherein the advancing includes advancing the elongate shaft through an inner lumen of a cannula;
wherein the inner lumen defines an inner diameter of the cannula;
the outer diameter of the elongate shaft is less than the inner diameter of the cannula; and
in the second state the energy cable is bent radially outward so as to be wider than the inner diameter.

20. The method of claim 19, further comprising homing the surgical instrument in the second state with the elongate shaft positioned in the inner lumen of the cannula and the distal joint element positioned distal to the cannula.

21. The method of claim 15, wherein, with the surgical instrument in the first state, the distal joint element cannot be articulated relative to the elongate shaft; and
with the surgical instrument in the second state, the distal joint element can be articulated relative to the elongate shaft.

* * * * *